United States Patent
Vess

(10) Patent No.: US 8,151,851 B2
(45) Date of Patent: Apr. 10, 2012

(54) APPARATUS FOR MAKING BAG ASSEMBLY AND METHOD THEREOF

(75) Inventor: Mark A. Vess, Hanson, MA (US)

(73) Assignee: Tyco Healthcare Group LP, Mansfield, MA (US)

( * ) Notice: Subject to any disclaimer, the term of this patent is extended or adjusted under 35 U.S.C. 154(b) by 280 days.

(21) Appl. No.: 12/486,467

(22) Filed: Jun. 17, 2009

(65) Prior Publication Data

US 2010/0319846 A1    Dec. 23, 2010

(51) Int. Cl.
*B29C 65/04* (2006.01)

(52) U.S. Cl. ............... 156/380.3; 156/272.2; 156/379.6; 156/380.2; 219/765

(58) Field of Classification Search ............... 156/272.2, 156/367, 378, 380.3, 379.6, 380.2; 219/765; 333/32

See application file for complete search history.

(56) References Cited

U.S. PATENT DOCUMENTS

| | | |
|---|---|---|
| 2,422,525 A | 6/1947 | Brown et al. |
| 2,764,862 A | 10/1956 | Rado |
| 2,816,596 A | 12/1957 | Welch, Jr. |
| 3,454,442 A | 7/1969 | Heller, Jr. |
| 3,574,031 A | 4/1971 | Heller, Jr. et al. |
| 3,583,458 A | 6/1971 | Costa |
| 3,783,217 A | 1/1974 | Brown |
| 3,945,867 A | 3/1976 | Heller, Jr. et al. |
| 4,023,607 A | 5/1977 | Jensen et al. |
| 4,091,804 A | 5/1978 | Hasty |
| 4,126,167 A | 11/1978 | Smith et al. |
| 4,352,669 A | 10/1982 | Norton |
| 4,384,186 A | 5/1983 | Burt |
| 4,390,832 A | 6/1983 | Taylor |
| 4,417,122 A | 11/1983 | Thorne |
| 4,417,753 A | 11/1983 | Bacehowski et al. |
| 4,425,177 A | 1/1984 | Shinno |
| 4,453,538 A | 6/1984 | Whitney |
| 4,465,487 A | 8/1984 | Nakamura et al. |
| 4,484,904 A | 11/1984 | Fowler |
| 4,496,095 A | 1/1985 | Renshaw et al. |
| 4,549,684 A | 10/1985 | Telly et al. |
| 4,600,613 A | 7/1986 | Yoshida |
| 4,650,452 A | 3/1987 | Jensen |
| 4,809,684 A | 3/1989 | Gardner et al. |
| 4,836,691 A | 6/1989 | Suzuki et al. |
| 4,876,788 A | 10/1989 | Steer et al. |
| 4,892,604 A | 1/1990 | Measells et al. |
| 4,950,347 A | 8/1990 | Futagawa |
| 4,979,953 A | 12/1990 | Spence |
| 5,047,605 A | 9/1991 | Ogden |

(Continued)

OTHER PUBLICATIONS

European Search Report regarding related application serial No. EP 10166289.8 dated Oct. 29, 2010, 8 pgs.

*Primary Examiner* — Richard Crispino
*Assistant Examiner* — Elizabeth Royston
(74) *Attorney, Agent, or Firm* — Thomas M. Johnston, Esq.

(57) ABSTRACT

A method of and apparatus for forming a bag assembly by RF welding. A single source of RF energy is used to generate a high frequency electric field having a first strength between tube-welding electrodes of opposing die members and a second strength less than the first strength between perimeter-welding electrodes of the opposing die members. Respective portions of the bag assembly are subjected to this variable-strength field simultaneously so that the bag assembly is formed in one welding operation. Stand-offs are used in some embodiments to limit penetration of the electrodes into the weld areas.

10 Claims, 21 Drawing Sheets

U.S. PATENT DOCUMENTS

| | | |
|---|---|---|
| 5,278,382 A | 1/1994 | Rische et al. |
| 5,324,233 A | 6/1994 | Owensby et al. |
| 5,349,166 A | 9/1994 | Taylor |
| 5,354,260 A | 10/1994 | Cook |
| 5,427,645 A | 6/1995 | Lovin |
| 5,437,595 A | 8/1995 | Smith |
| 5,507,904 A | 4/1996 | Fisher et al. |
| 5,591,337 A | 1/1997 | Lynn et al. |
| 5,678,732 A | 10/1997 | Gianpaolo |
| 5,769,801 A | 6/1998 | Tumey et al. |
| 5,803,888 A | 9/1998 | Severs et al. |
| 5,976,300 A | 11/1999 | Buchanan et al. |
| 5,989,204 A | 11/1999 | Lina |
| 6,001,119 A | 12/1999 | Hampson et al. |
| 6,011,235 A | 1/2000 | Mukai et al. |
| 6,036,718 A | 3/2000 | Ledford et al. |
| 6,127,009 A | 10/2000 | Strassmann |
| 6,259,059 B1 | 7/2001 | Hsu |
| 6,486,456 B1 | 11/2002 | Moro et al. |
| 6,601,710 B2 | 8/2003 | Calhoun et al. |
| 6,652,942 B2 | 11/2003 | Ling et al. |
| 6,828,536 B1 | 12/2004 | Grimes et al. |
| 7,012,232 B1 | 3/2006 | Gruenspecht et al. |
| 7,041,936 B2 | 5/2006 | Oberzaucher et al. |
| 7,237,290 B2 | 7/2007 | Bichler |
| 7,353,946 B2 | 4/2008 | Cervantes |
| 7,399,375 B2 | 7/2008 | Leiser et al. |
| 2004/0026391 A1 | 2/2004 | Oberzaucher et al. |
| 2004/0054306 A1 | 3/2004 | Roth et al. |
| 2004/0199090 A1 | 10/2004 | Sanders et al. |
| 2007/0038167 A1 | 2/2007 | Tabron et al. |
| 2007/0045240 A1 | 3/2007 | Smith et al. |
| 2007/0135835 A1 | 6/2007 | McEwen et al. |
| 2008/0041847 A1 | 2/2008 | Gruenspecht et al. |
| 2008/0149609 A1 | 6/2008 | Vess |
| 2008/0249447 A1 | 10/2008 | Brown et al. |
| 2008/0269658 A1 | 10/2008 | Vinton et al. |

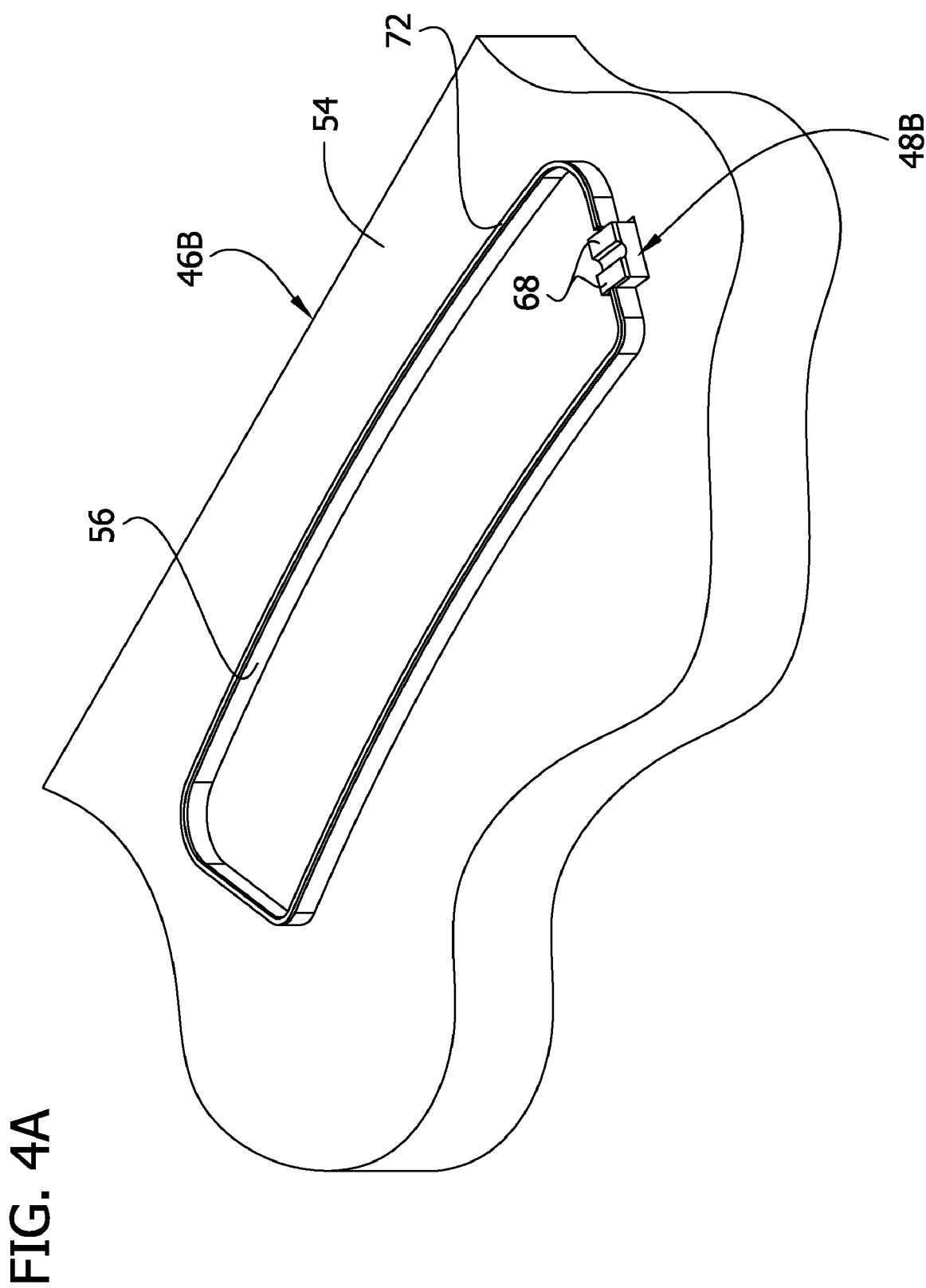

FIG. 12
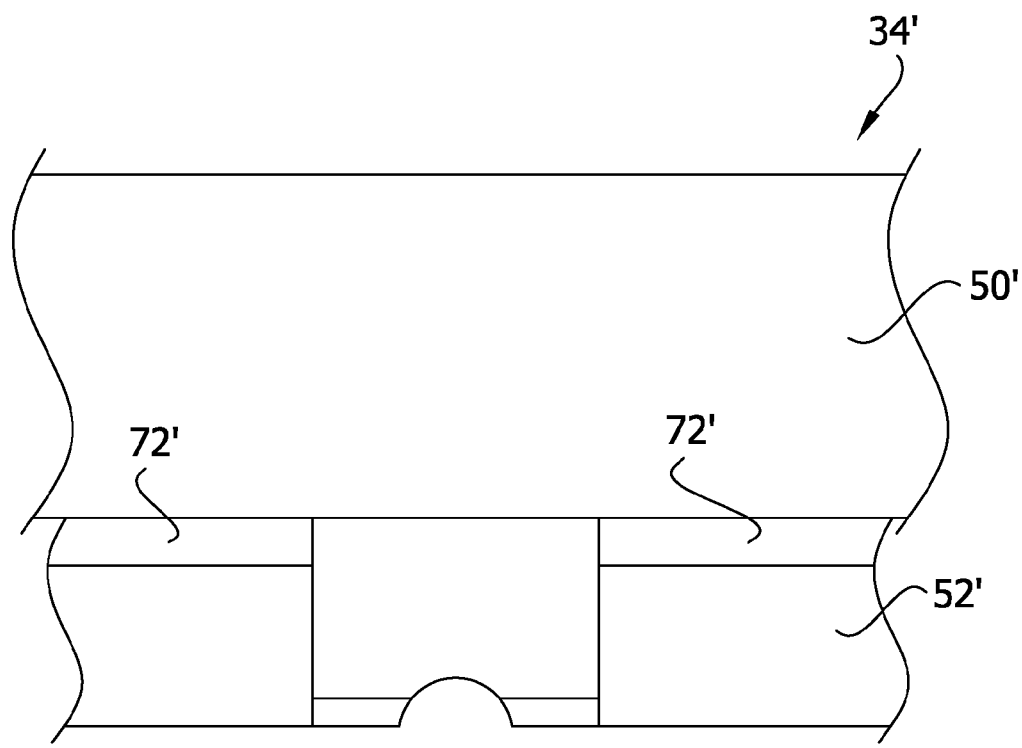
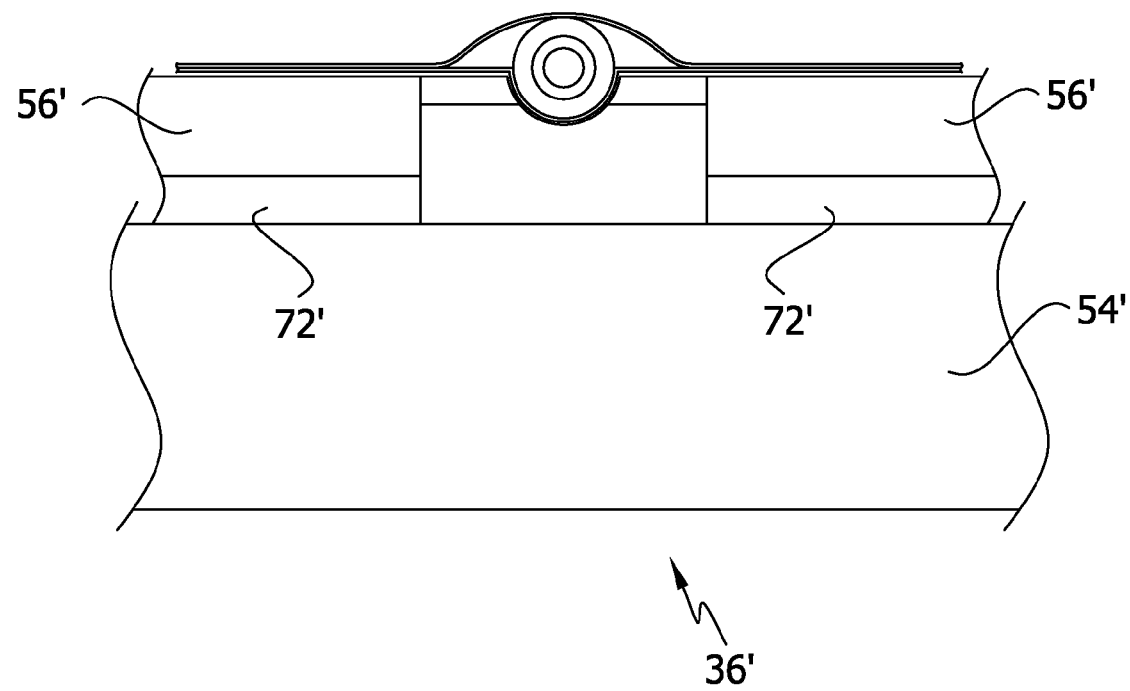

APPARATUS FOR MAKING BAG ASSEMBLY AND METHOD THEREOF

FIELD OF THE INVENTION

The present invention generally relates to an apparatus for forming a bag assembly including a bag and a tube providing fluid communication with an interior of the bag.

BACKGROUND OF THE INVENTION

Welding by radiofrequency (RF) energy is an efficient and fast way to manufacture certain products. For example, radiofrequency energy may be used to weld polymeric material, such as polyvinyl chloride (PVC), to make flexible bags for retaining fluid. For example, a bag for receiving pressurized air is incorporated into a vascular compression device for preventing pulmonary embolisms and deep vein thrombosis (DVT).

A bag of a typical vascular compression device includes a pair of opposing polymeric sheets, such as PVC, welded around their perimeters and a polymeric tube port, such as PVC, welded between the sheets in fluid communication with the bag. An exemplary conventional process for forming the bag uses a die for welding the bags together and a cylindrical mandrel for welding the polymeric sheets to the tube. The cylindrical mandrel is inserted into the tube, and the mandrel, the tube and the opposing sheets are compressed between the dies. Radiofrequency energy is supplied to the die to create a radiofrequency electric field. The electric field heats the polymeric sheets, thereby welding the sheets together form the perimeter of the bag.

After the bag is welded, the radiofrequency energy directed to the dies is stopped. Radiofrequency energy is then supplied to the mandrel so that the radiofrequency electric field is directed outward in a radial direction from the mandrel, through the tube and sheets. The radiofrequency electric field heats the tube and the sheets, thereby welding the sheets to the tube and welding the tube in fluid communication with the bag.

The use of a cylindrical mandrel may be inefficient and time-consuming because of the difficulties in both inserting the mandrel into the tube and removing the mandrel from the tube after the process.

In another exemplary process, the mandrel is replaced by a rigid, non-deformable tubular insert that is received in the tube. Like the above process, radiofrequency energy is supplied to a die, for example, to create an electric field. However, in this process, the die includes portions that surround the tube and the tubular insert and direct the radiofrequency electric field into the tube and the sheets surrounding the tube to weld them together.

Although this process purportedly welds both the bag and the tube to the bag at the same time and in one step, the use of a tubular insert, without more, is not sufficient to weld both the bag and the sheets to the tube. Welding the sheets to the tube takes longer than welding the bag because the tube is typically thicker than the polymeric sheet. If the process lasted long enough to adequately weld the sheets to the tube, then there is a risk that the die will cut or at least weaken the bag at the bag perimeter because of the amount of time the sheets would be subjected to the electric field.

SUMMARY OF THE INVENTION

In one aspect, this invention is directed to an improved method of forming a bag assembly by RF welding. The method comprises inserting a tubular insert into a lumen of a tube to form a tube assembly, and placing opposing sheets and the tube assembly at least partially received between the sheets between first and second opposing die members of a welding apparatus. The first die member includes a first tube-welding electrode and a first perimeter-welding electrode and the second die member includes a second tube-welding electrode and a second perimeter-welding electrode. The method further comprises generating from a single source of RF energy a high frequency electric field having a first strength between the tube-welding electrodes of the opposing die members and a second strength less than said first strength between the perimeter-welding electrodes of the opposing die members. The tube assembly and corresponding portions of the sheets surrounding the tube assembly are subjected to the high frequency electric field of said first strength for a predetermined amount of time to weld the sheets to the tube along a tube-weld, and corresponding portions of the sheets between the perimeter-welding electrodes are subjected to the high frequency electric field of said second strength for said predetermined amount of time to weld the sheets together along a bladder perimeter-weld. The subjecting steps are performed simultaneously so that the bag assembly is formed in one welding operation.

In another aspect, this invention is directed to welding apparatus for use in one-step welding to form a bag assembly comprising a bag and a tube in fluid communication with the bag. The welding apparatus comprises first and second die members opposing one another and defining a space therebetween for receiving opposing sheets and a tube therebetween. The first and second die members include opposing respective first and second perimeter-welding electrodes adapted to weld the sheets together to define a perimeter-weld of the bag and opposing respective first and second tube-welding electrodes adapted to weld the sheets to the tube to define a tube-weld so that the tube is in fluid communication with the bag. A single source of high frequency energy is electrically connected to the first and second perimeter-welding electrodes and the first and second tube-welding electrodes to produce a high frequency electric field between the perimeter-welding electrodes and the tube-welding electrodes. Dielectric material is provided for reducing the strength of the high frequency electric field between the first and second perimeter-welding electrodes as compared to the strength of the high frequency electric field between the first and second tube-welding electrodes so that the sheets are welded to the tube and the sheets are welded together in a single welding operation.

In another aspect, this invention is directed to welding apparatus for manufacturing a bag assembly having a pair of opposing sheets welded together to form a bag for holding a fluid and having a tube in fluid communication with an interior of the bag. The apparatus comprises opposing first and second die members including opposing respective first and second perimeter-welding portions for welding the sheets together to form a perimeter-weld of the bag assembly and opposing respective first and second tube-welding portions for welding the sheets to the tube to form a tube-weld of the bag assembly. The opposing first and second die members are movable between an open position in which the opposing first and second perimeter-welding portions and the opposing first and second tube-welding portions are spaced apart to permit insertion of the sheets and the tube and removal of the formed bag assembly, and a weld position in which the opposing first and second perimeter-welding portions and the opposing first and second tube-welding portions are closer together and engage the sheets for welding. A stop device is provided for limiting movement of the opposing first and second perimeter-welding portions toward each other to prevent excessive displacement of sheet material in the perimeter-weld by engagement with the perimeter-welding portions.

Another aspect of this invention is directed to a method of forming a bag assembly. The method comprises placing a bag subassembly, comprising a polymeric tube disposed between opposing polymeric sheets, between opposed die members of a welding apparatus, inserting a tubular insert into a lumen of the tube before the tube is welded between the sheets, and moving the die members toward each other to contact the sheets so that perimeter-welding portions of the die members weld the sheets together to form a perimeter-weld and tube-welding portions of the die members weld the sheets to the tube to form a tube-weld. The method further comprises limiting movement of at least the perimeter-welding portions of the die members toward each other to prevent excessive displacement of sheet material in the perimeter-weld by engagement with the perimeter-welding portions.

Other objects and features will be in part apparent and in part pointed out hereinafter.

BRIEF DESCRIPTION OF THE DRAWINGS

FIG. 4A is an enlarged, fragmentary perspective of a lower die member of the welding apparatus;

FIG. 12 is a view similar to FIG. 9 showing an embodiment where dielectric material has been placed at alternative locations;

Corresponding reference characters indicate corresponding parts throughout the drawings.

DETAILED DESCRIPTION OF THE DRAWINGS

Figure 1:
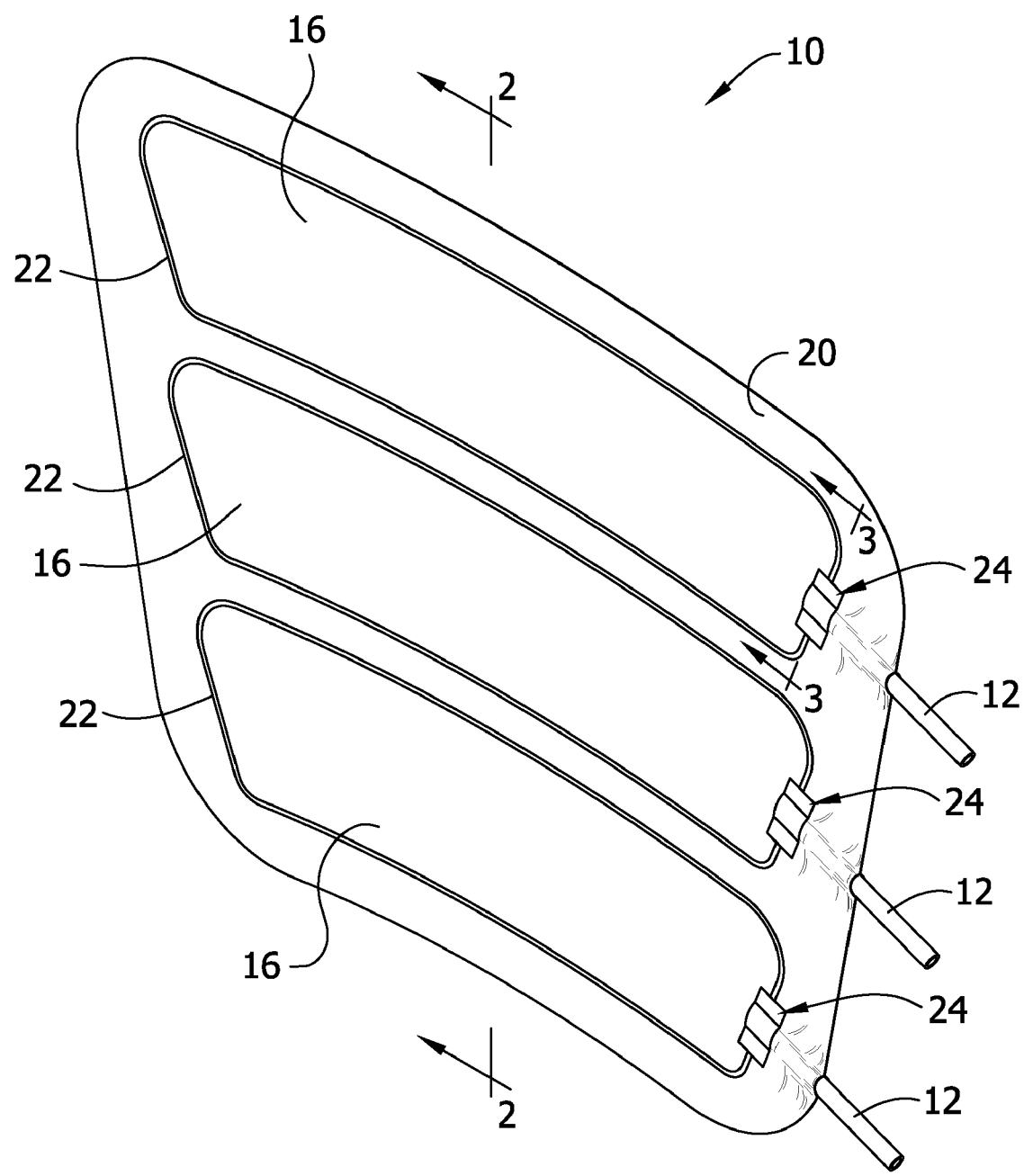
FIG. 1 is a perspective of one embodiment of a bag assembly.
Figure 2:
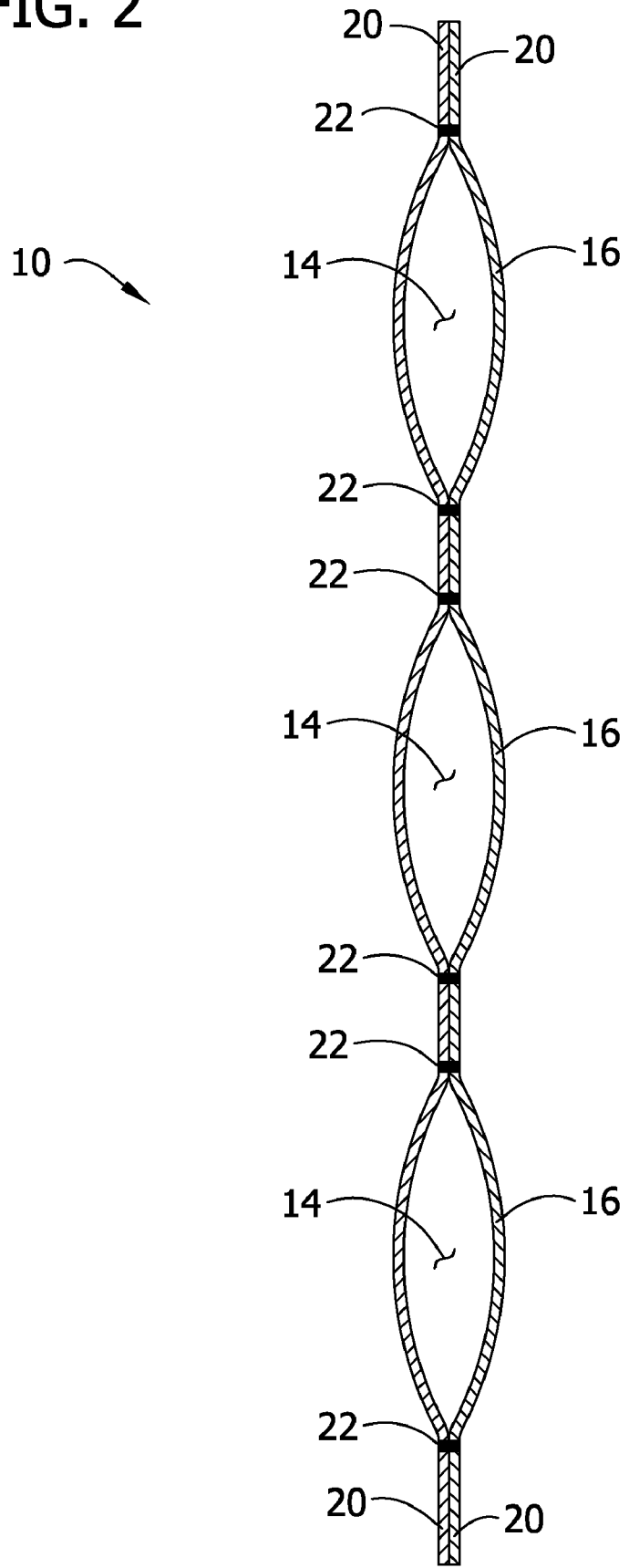
FIG. 2 is section of the bladder assembly taken in the plane including the line 2-2 of FIG. 1.
Figure 3:
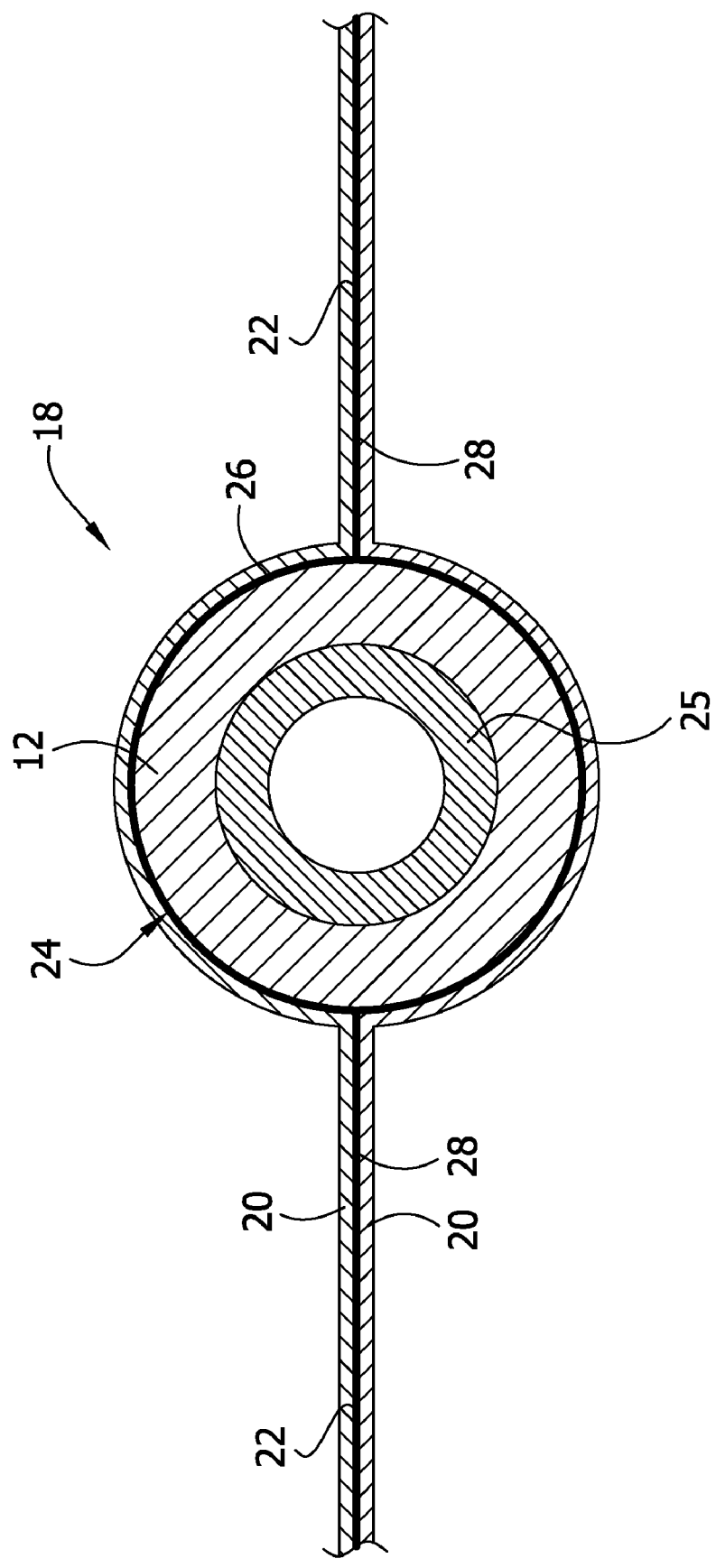
FIG. 3 is an enlarged fragmentary section of the bladder assembly taken in the plane including the line 3-3 of FIG. 1.

Referring now to the drawings, and in particular to FIG. 1, a bag assembly is generally indicated at 10. The bag assembly is constructed for use with a vascular compression device and is often referred to in the art as a bladder assembly. The assembly includes a number of tubes 12, each being in sealed fluid communication with an interior 14 (FIG. 2) of a respective bladder 16 at a tube port generally indicated at 18 (FIG. 3). Opposed sheets 20 are welded together along perimeter-welds 22 to define the three bladders 16. It will be understood that the bladders 16 in the bladder assembly 10 can be of any desired number, as can the number of tubes 12 in each bladder. The use of a bag assembly for other than a vascular compression device, including use to hold a liquid, is within the scope of the present invention.

Each tube port 18 includes a tubular insert 25 in the tube 12 for use in welding the sheets 20 to the tube 12. The tubular insert 25 is explained in more detail below. The tubes 12 are welded between the opposed sheets 20 at tube-welds, generally indicated at 24, so that each of the tubes is sealed with the interior 14 of one of the bladders 16, and so that fluid communication with the interior of the bladder occurs only through the tube port 18 (FIGS. 1 and 3). Each tube-weld 24 includes a circumferential-weld area 26 that extends around a circumference of the tube 12 and a pair of opposed lateral-weld areas 28 that extend laterally from the circumferential-weld area at opposite lateral sides of the tube. The lateral-weld areas 28 are contiguous with the circumferential-weld area 26 and the perimeter weld 22 defining the bladder 16. At a later stage of production of the vascular compression device, a connector (not shown) may be secured to ends of the tubes 12. The connector secures the tubes to an air compressor for introducing pressurized air into the bladders 16. As is known to those skilled in the art, other layers of material may be applied onto the bladder assembly 10 to complete production of the vascular compression device. Moreover, the sheets 20 forming the bladders 16 may have any number of layers of material. Moreover still, instead of securing full length tubes 12 to the sheets 20, short pieces of tubing (not shown) may be secured to the sheets, and at a later stage of production, full length tubes may be secured to the short pieces. Other arrangements are within the scope of the invention.

Referring to FIGS. 4-11, an exemplary embodiment of a welding apparatus for making the bladder assembly 10 is generally indicated at 30. The apparatus 30 includes a die 32 comprising an upper (broadly, first) die member, generally indicated at 34, and an opposing lower (broadly, second) die member, generally indicated at 36. A press device 38 of the welding apparatus 30 presses the opposed sheets 20 and the tube 12 disposed between the sheets between the die members 34, 36. A radiofrequency (RF) generator 40 (broadly, a source of radiofrequency current) electrically connected to the die 32 creates a radiofrequency field between the die members 34, 36 that heats the sheets 20 and the tube 12 to weld the sheets into a bladder 16 and to weld the sheets to the tube. Prior to being welded together, the sheets 20 and tube 12 may be referred to as a "bladder assembly" and, more broadly, as a "bag assembly." Other components may be included in the subassembly and some components may be already connected together within the scope of the present invention. The bladder subassembly is generally indicated at 42 in FIG. 9. The welding apparatus 30 also includes a microcontroller 44 for integrating control of the press device 38 and the source of radiofrequency generator 40.

As shown best in FIGS. 4A-6, each die member 34, 36 comprises a perimeter-welding portion, generally indicated at 46A and 46B, respectively, for welding the sheets 20 together to define the perimeter of the bladder 16 and a tube-welding portion, generally indicated at 48A and 48B, for welding the sheets around the tube 12. Because each die member 34, 36 includes one perimeter-welding portion 46A, 46B and one tube-welding portion 48A, 48B and because the bladder assembly 10 has more than one bladder 16 (i.e., three bladders), more than one operation must be performed to make the separate bladders of the bladder assembly. For example, there may be three separate welding apparatuses along a conveyor for welding the three separate bladders 16. It is understood that the welding apparatus 30 may be configured to weld any number of bladders of a single bladder assembly during the same operation. For example, the welding apparatus 30 may include more than one die for forming more than one bladder of the bladder assembly simultaneously. Alternatively, the welding apparatus may include a single die that has multiple (e.g., three) perimeter-welding portions 46A, 46B and multiple (e.g., three) tube-welding portions 48A, 48B. For clarity and for purposes of this discussion, the illustrated welding apparatus 30 has only one pair of perimeter-welding portions 46A, 46B and one pair of tube-welding portions 48A, 48B for forming one bladder 16 of the bladder assembly 10 per operation.

Figure 4:
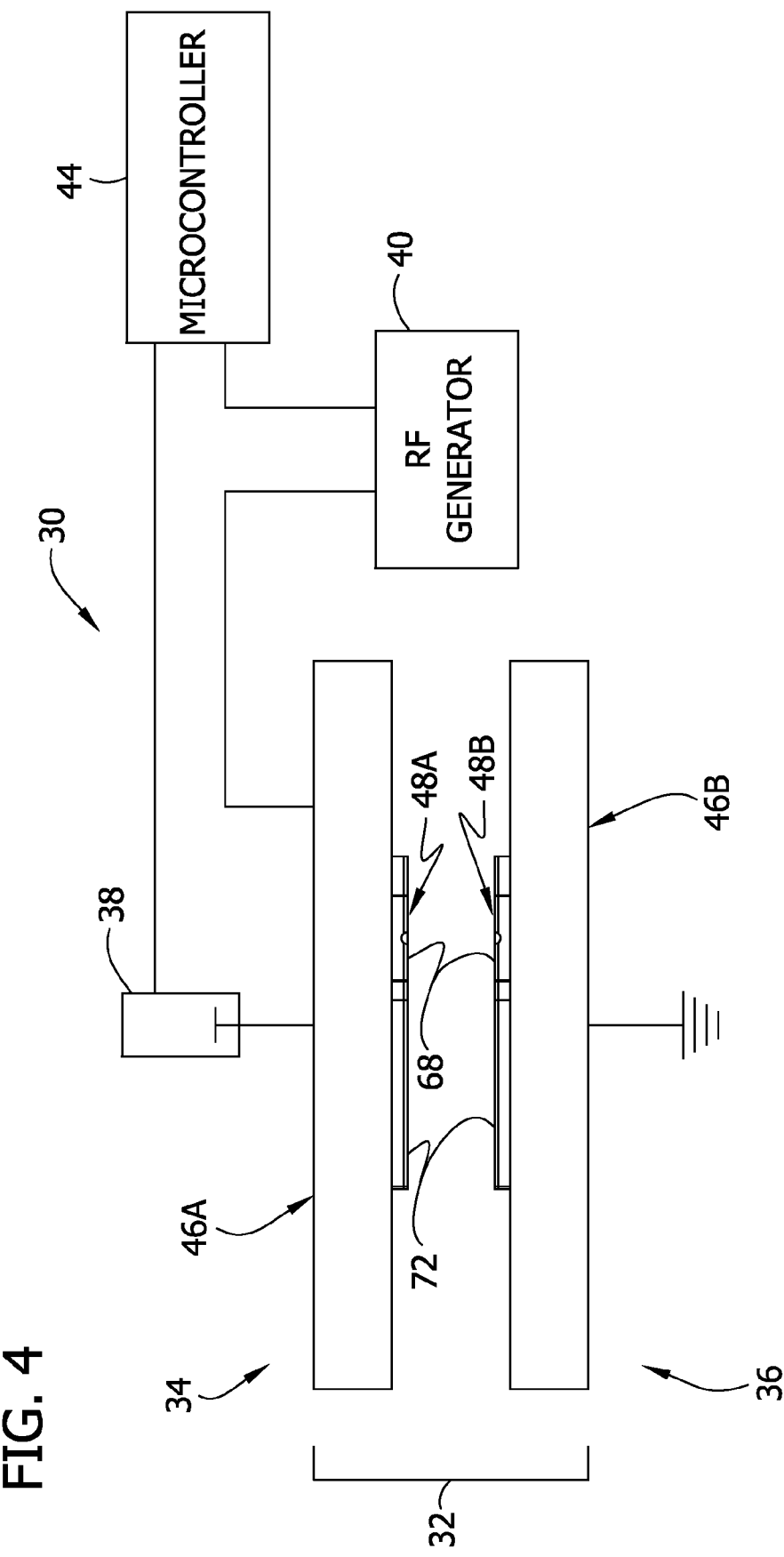
FIG. 4 is a schematic elevation of one embodiment of a welding apparatus for manufacturing the bladder assembly of FIG. 1.
Figure 5:
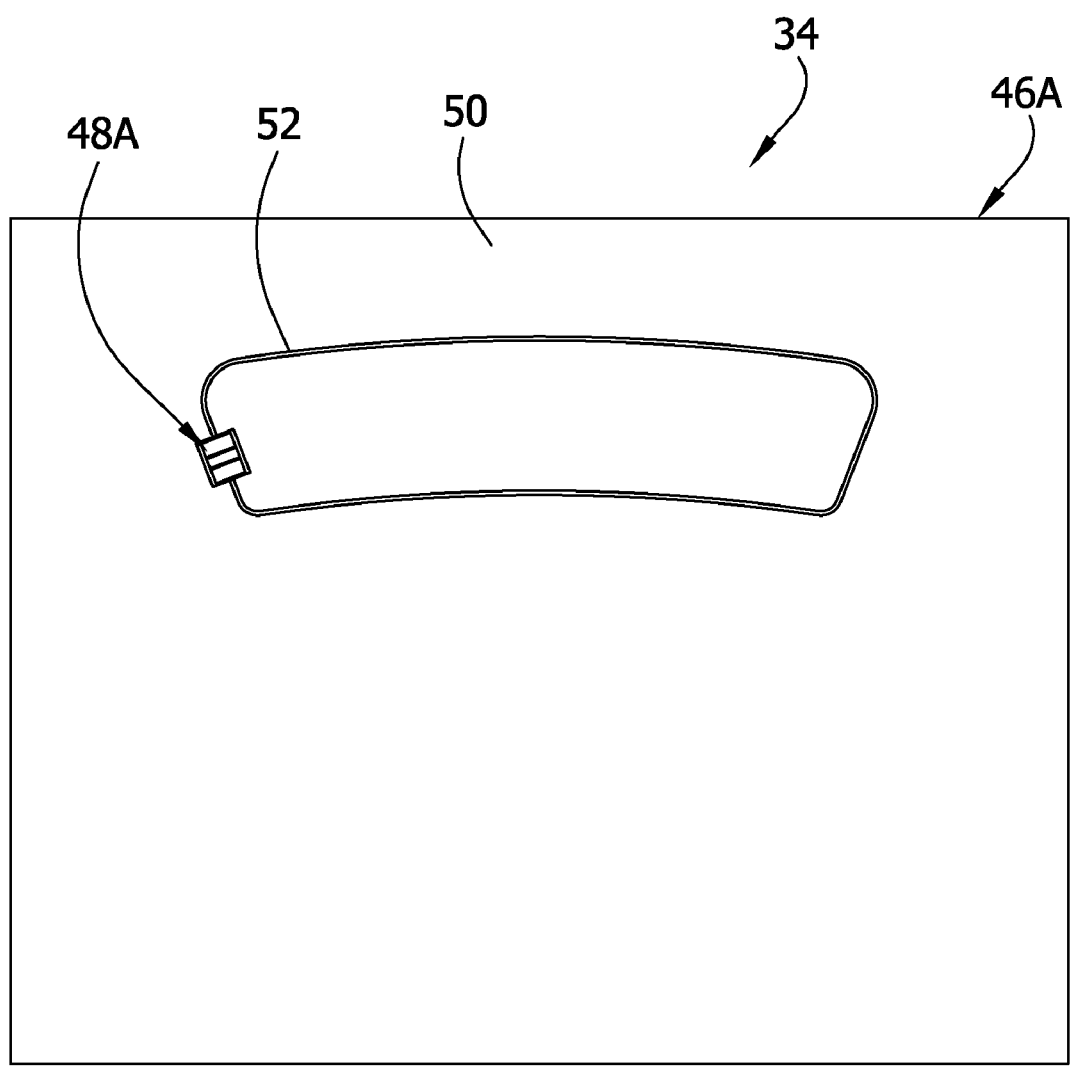
FIG. 5 is a plan view of an upper die member of the welding apparatus.
Figure 6:
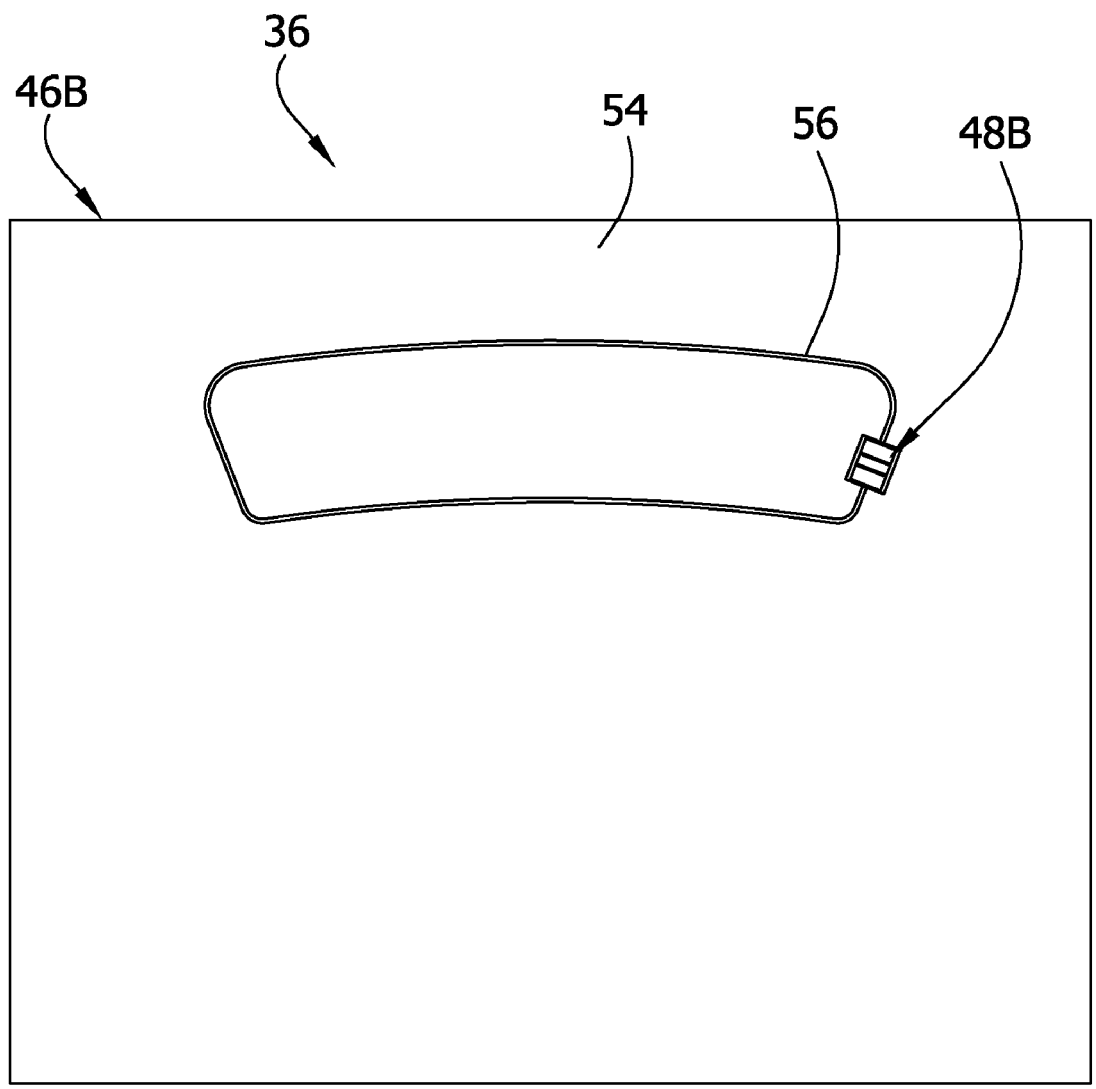
FIG. 6 is a plan view of the lower die member of FIG. 4.

Referring to FIGS. 4 and 5, the perimeter-welding portion 46A of the upper die member 34 includes an upper (broadly, first) perimeter-welding block 50 and an upper (broadly, first) perimeter-welding electrode 52 protruding down from the upper block. The radiofrequency generator 40 is electrically connected to the electrode 52 via the upper perimeter-welding block 50. The electrode 52 is elongate and has a shape or outline corresponding generally to the shape of the perimeter of the bladder 16, except that the electrode is not continuous. That is, the electrode 52 has spaced apart ends. The perimeter-welding portion 46B of the lower die member 36 includes a lower (broadly, second) perimeter-welding block 54 and a lower (broadly, second) perimeter-welding electrode 56 protruding upward from the lower block (FIGS. 4, 4A and 6). The lower perimeter-welding block 54 is electrically grounded. The shape of the electrode 56 is a mirror image of the upper perimeter-welding electrode 52, and both electrodes are illustrated as ribbon electrodes. The electrodes 52, 56 may be of other constructions. For example, either the upper or the lower perimeter-welding electrode 52, 56, respectively, may comprise a nest for receiving the other electrode, or either the upper or the lower perimeter-welding electrode may be a planar surface. Other configurations are within the scope of this invention. The perimeter-welding blocks 50, 54 and electrodes 52, 56 may be formed from any electrically conductive material. For example, the electrodes 52, 56 may be constructed of brass or copper or aluminum or stainless steel or magnesium and/or may be copper-plated or brass-plated.

Figure 7:
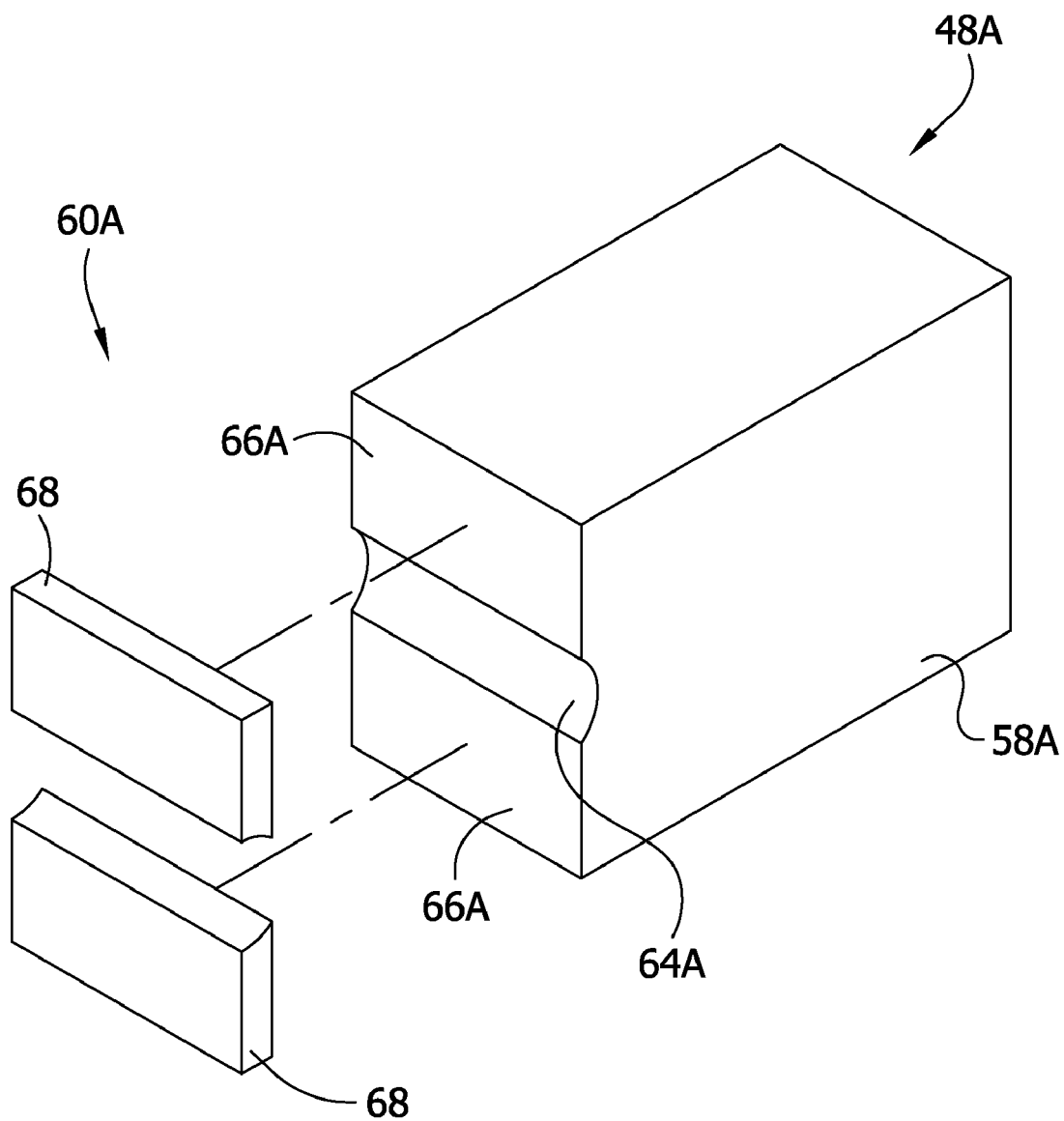
FIG. 7 is a perspective of the tube-welding portion of the upper die member.
Figure 8:
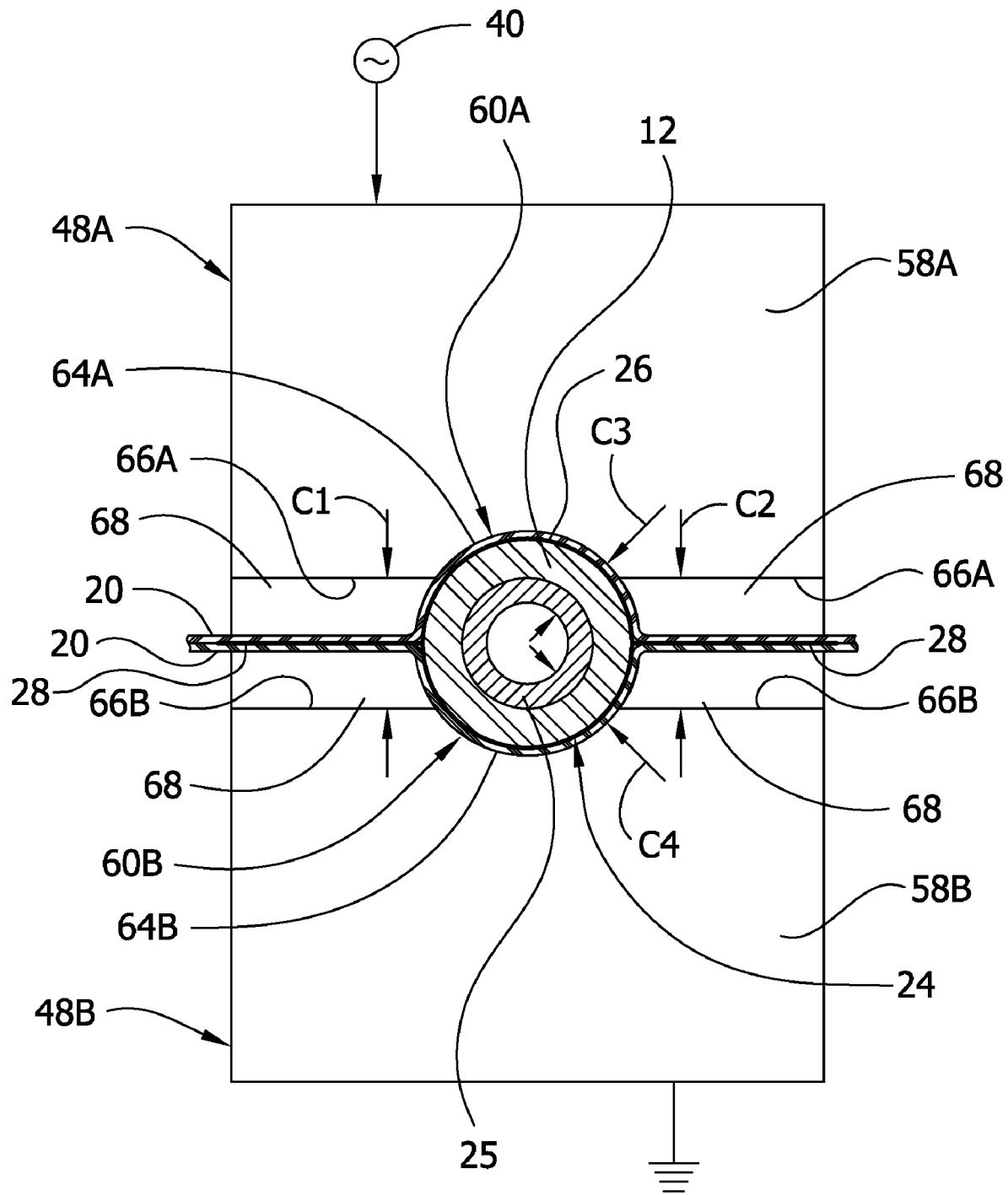
FIG. 8 is a front elevation of the tube-welding portions forming a tube-weld of the bladder assembly, electrical flow of radiofrequency energy from a radiofrequency generator being shown schematically.
Figure 9:
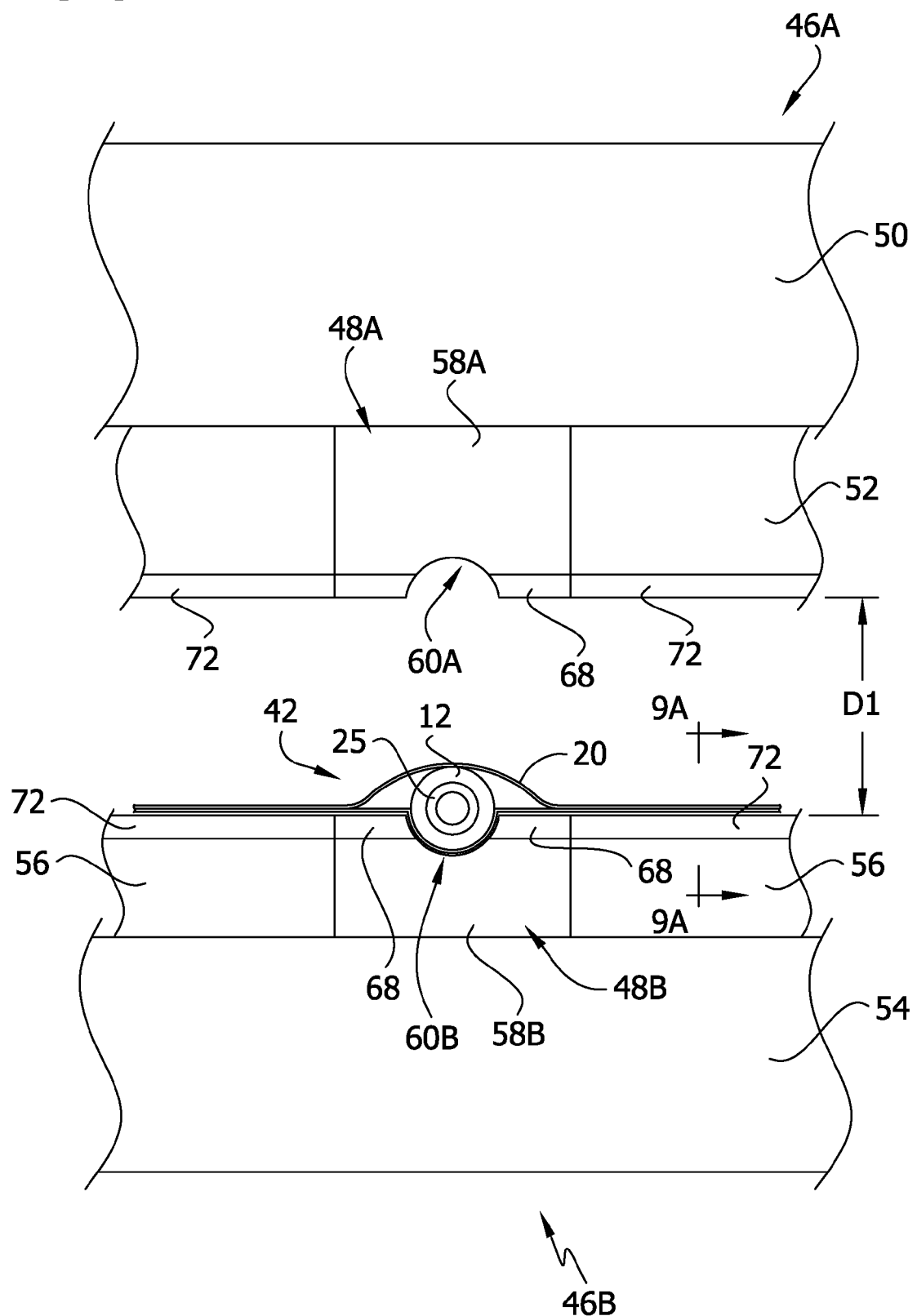
FIG. 9 is an enlarged, fragmentary section of the upper and lower die members with the upper die member in an initial configuration and a bladder subassembly disposed between the upper and lower die members.

Referring to FIGS. 7-9, each of the tube-welding portions 48A, 48B of the upper and lower die members 34, 36, respectively, includes a tube-welding block 58A, 58B, respectively, and a tube-welding electrode, generally indicated at 60A, 60B, respectively, on the tube-welding block. The tube-welding blocks 58A, 58B are secured to respective perimeter-welding blocks 50, 54 so that tube-welding electrodes 60A, 60B are disposed between opposite ends of the respective perimeter-welding electrodes 52, 56. The tube-welding blocks 58A, 58B are secured in fixed position to respective perimeter-welding blocks 50, 54 by suitable means. The tube-welding blocks 58A, 58B and electrodes 60A, 60B are electrically connected to the respective perimeter-welding blocks 50, 54 and electrodes 52, 56, so that the upper tube-welding block 58A is electrically connected to the radiofrequency generator 40 and the lower tube-welding block 58B is electrically grounded. It will be appreciated that the electrical connection can be reversed within the scope of the present invention.

Alternatively, the tube-welding blocks 58A, 58B and electrodes 60A, 60B may be movable in recesses in respective perimeter-welding blocks 50, 54, as described in Applicants' co-pending application Ser. No. 11/613,694, Publication No. US 2008/0149609, entitled Apparatus and Method for Making Bag Assembly, incorporated herein by reference.

Referring to FIGS. 7 and 8, each tube-welding electrode 60A, 60B includes a concave, arcuate surface 64A, 64B, respectively, and opposite, planar lateral surfaces 66A, 66B, respectively. The concave, arcuate surfaces 60A, 60B are sized and shaped to substantially completely surround the axial portion of the tube 12 to be welded in the bladder assembly 10 when the bladder subassembly 42 is pressed between the die members 34, 36. The radiofrequency (RF) electric field applied between these concave surfaces 64A, 64B forms the circumferential-weld area 26 of the tube-weld 24 (see FIG. 3). The concave, arcuate surfaces 64A, 64B generally have depths and widths slightly greater than the radius of the tube 12 to accommodate the thicknesses of the sheets 20 overlying and underlying the tube. Likewise, the radiofrequency field applied between the lateral surfaces 66A, 66B of the electrodes 60A, 60B forms the lateral-weld areas 28 of the tube-weld 24. The tube-welding blocks 58A, 58B and electrodes 60A, 60B may have other shapes and may be formed from any electrically conductive material. For example, the electrodes 60A, 60B may be constructed of brass or copper or aluminum or stainless steel or magnesium and/or may be copper-plated or brass-plated.

In general, the perimeter-welding electrodes 52, 56 and the tube-welding electrodes 60A, 60B are configured so that the strength of the electrical field between the perimeter-welding electrodes is less than the strength of the electrical field between the tube-welding electrodes, at least in the area(s) between the tube-welding electrodes where the components to be welded (tube 12 and sheets 20) have a combined thickness greater than the combined thickness of the components to be welded (sheets 20 only) between the perimeter-welding electrodes. By varying the strength of the electric field between the perimeter-welding electrodes 52, 56 relative to the strength of electric field between the tube-welding electrodes 60A, 60B, the perimeter-weld 22 and tube-weld 24 can be completed substantially simultaneously in a single welding operation and using a single source of high frequency energy (e.g., RF generator 40). As used in this context, "substantially simultaneously" means that the perimeter and tube-welds 22, 24 are formed during the same (coincident) or overlapping time periods. As described below, the relative strengths of the electric field between the perimeter-welding electrodes 52, 56 and the tube-welding electrodes 60A, 60B can be controlled by using dielectric material between the electrodes.

Referring to FIG. 8, dielectric material 68 (e.g., nylon, Delrin, phenolic resins such as Bakelite, or any other resin-based dielectric material) is connected to the planar lateral surfaces 66A, 66B of the upper and lower tube-welding electrodes 60A, 60B but not to the arcuate, concave surfaces 64A, 64B of the electrodes. The dielectric material 68 contacts the sheets 20 in the lateral-weld areas and has a selected thickness and a selected dielectric constant so that the lateral-weld areas 28 and the circumferential-weld area 26 are formed at substantially the same rate. (Determination of the proper thickness and dielectric constant of the dielectric material 68 to ensure proper welding is generally referred to as "tuning.") In this regard, the dielectric material 68 on the lateral surfaces 66A, 66B of the electrodes decreases the strength of the electric field in the lateral-weld areas 28 so as to slow heating to a rate that is substantially similar to the heating rate of the tube 12 and the portions of the sheets 20 surrounding the tube. As is known in the art, the circumferential-weld area 26 of the tube-weld 24 is heated at a slower rate than the lateral-weld areas 28 due to the thickness of the tube 12. Thus, without the dielectric material 68, one of two situations may arise. If the tube-welding portion 48A of the upper die member 34 is not removed from the sheets 20 until after the circumferential-weld area 26 is complete, there is a risk that the lateral-weld areas 28 will burn or will thin out and weaken. On the other hand, if the tube-welding portion 48A is removed from the sheets 20 immediately after the lateral-weld areas 28 are complete, there is a risk that the circumferential-weld area 26 will not be fully formed. The use of dielectric material 68, however, varies the strength of the electric field over the tube-weld 26 (i.e., a greater strength in the circumferential-weld area 26 compared to the lateral-weld areas 28) and allows for the different areas of the tube-weld to be completed at substantially the same time, thus avoiding the problems of weakening the weld or making an incomplete weld.

Referring to FIG. 9, dielectric material 72 (e.g., nylon, Delrin, phenolic resins such as Bakelite, or any other resin-based dielectric material) is also provided between the upper and lower perimeter-welding electrodes 52, 56 of the upper and lower die members 34, 36. The dielectric material 72 is "tuned" to have a selected thickness and a selected dielectric constant such that when RF energy is supplied to the die from the RF source 40, the strength of the electrical field between the perimeter-welding electrodes 52, 56 is less than the strength of the electrical field between the tube-welding electrodes 60A, 60B, at least in the circumferential-weld area 26. This variation in strength compensates for the fact that the combined thickness of the sheets 20 in the perimeter-weld area 22 is less than the combined thickness of the sheets 20 and tube 12 in at least the circumferential-weld area 26 of the tube-weld 24. The dielectric material 72 between the perimeter-welding electrodes 52, 56 decreases the amount of radiofrequency (RF) energy being supplied to the sheets 20 in the perimeter-weld area 22 so as to slow heating to a rate that is substantially similar to the heating rate of the tube 12 and the portions of the sheets 20 surrounding the tube in the circumferential-weld area 26 of the tube-weld 24. Without the dielectric material between the perimeter-welding electrodes 52, 56, one of two situations may arise. If the tube-welding portions 48A, 48B and perimeter-welding portions 46A, 46B of the die members 34, 36 are not removed from the sheets until after the tube-weld 24 is complete, there is a risk that the perimeter-welding electrodes 52, 56 will burn or thin out and weaken the perimeter-weld 22. On the other hand, if the tube-welding and perimeter-welding portions are removed from the sheets immediately after the perimeter-weld 22 is complete, there is a risk the tube-weld 24 will not be fully formed. The dielectric material 72 on one or both of the perimeter-welding portions 46A, 46B allows both the tube-weld 24 and the perimeter-weld 22 to be completely formed substantially simultaneously in one welding operation.

The dielectric material 68, 72 between the planar lateral surfaces 66A, 66B of the upper and lower tube-welding electrodes 60A, 60B and between the upper and lower perimeter-welding electrodes 52, 56 may be secured only to the upper electrodes 60A, 52, or only to the lower electrodes 60B, 56, or to both of the upper and lower electrodes 60A, 60B, 52, 56, or to any combination of upper and lower electrodes. In the illustrated example, the dielectric material or elements 68, 72 are suitably secured to both the upper and lower tube-welding electrodes 60A, 60B and to the upper and lower perimeter-welding electrodes 52, 56. In any case, the dielectric elements 68, 72 have selected thicknesses and selected dielectric constants so that the perimeter-weld 22 and tube-weld 24 are formed substantially simultaneously and completely in one welding operation. In this regard, the thickness and/or dielectric constant of the dielectric material 68 on the lateral surfaces 66A, 66B of the tube-welding electrodes 60A, 60B may be different from the thickness and/or dielectric constant of the dielectric material 72 on the perimeter-welding electrodes 52, 56. Further, the thickness and/or dielectric constant of the dielectric material 68, 72 on portions of the upper electrodes (e.g., the lateral surfaces 66A of the tube-welding electrode 60A or the perimeter-welding electrode 52) may be different from the thickness and/or dielectric constant of the dielectric material 68, 72 on corresponding portions of the lower electrodes 60B, 56. By thus tuning the dielectric material 68, 72, the relative strengths of the electric field between the various portions of the upper electrodes 52, 60A and lower electrodes 56, 60B can be controlled to achieve simultaneous formation of the perimeter-weld 22 and the tube-weld 24 so that the entire process can be completed in one welding operation.

Figure 9A:
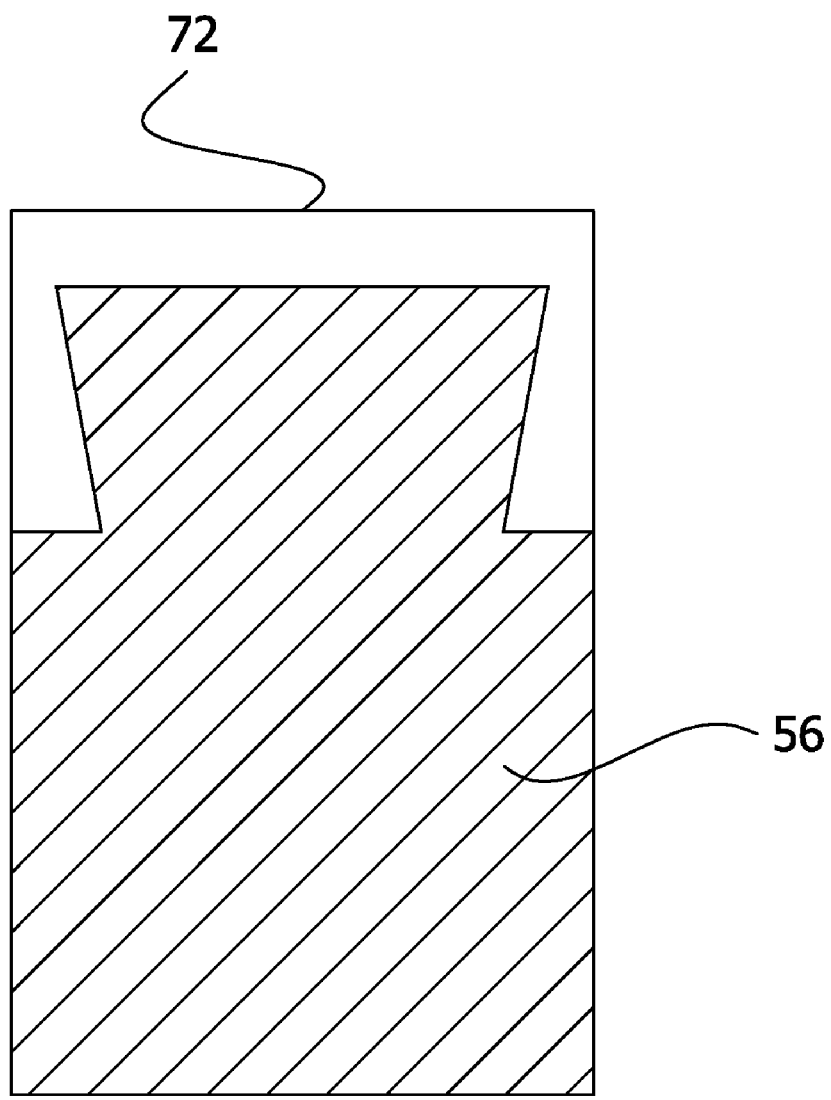
FIG. 9A is an enlarged section taken in the plane of lines 9A-9A of FIG. 9.

FIG. 9A illustrates one method of securing a dielectric element to a die component such as a tube-welding electrode 60A, 60B or a perimeter welding electrode 52, 56. In FIG. 9A, the dielectric element 72 is formed as a cap which has releasable dovetail connection with the electrode 56 for easy replacement of the element in the event of damage or wear. Other types of releasable mechanical connections between the element 72 and the electrode 56 can be used. Alternatively, the connection can be achieved by a suitable molecular bond adhesive, epoxy, or high-temperature glues compatible with the dielectric material.

Figure 10:
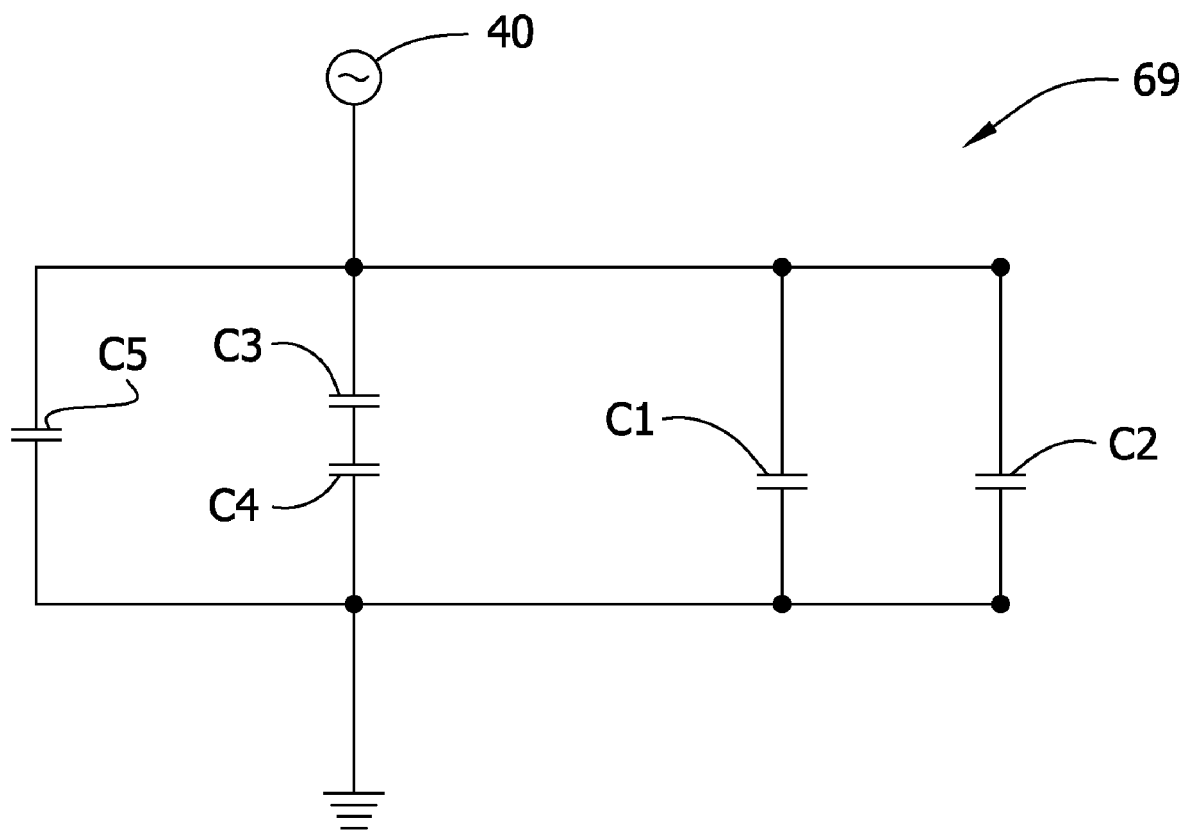
FIG. 10 is an electrical schematic representing components of the tube-welding and perimeter-welding portions as electrical components.
Figure 11:
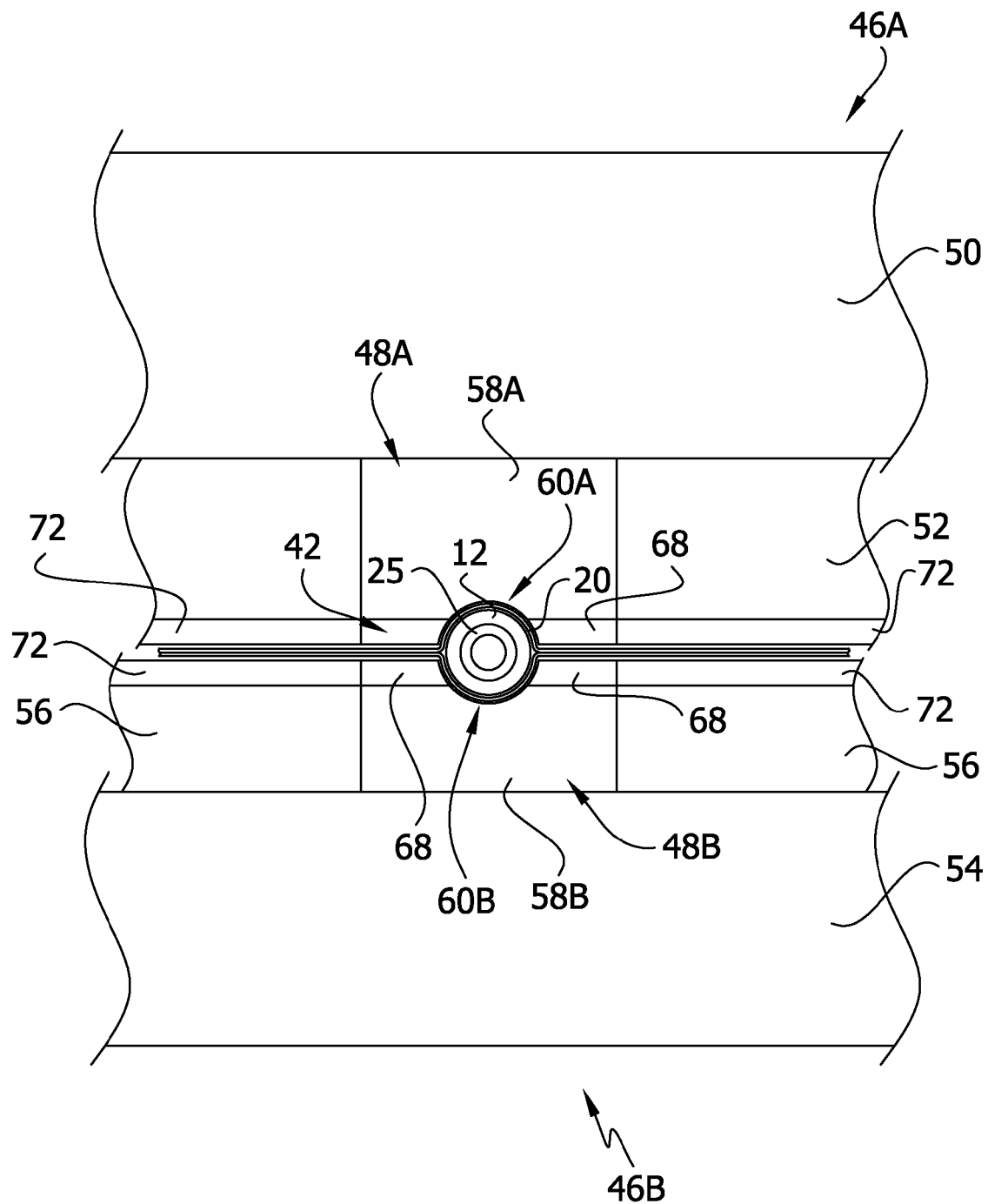
FIG. 11 is similar to FIG. 9 with the upper die member being in a primary welding configuration, in which a perimeter-weld and a tube-weld are being formed on the bladder assembly.

Referring to FIGS. 9-11, during operation the radiofrequency generator 40 delivers radiofrequency (RF) energy to the upper tube welding portion 48A and upper perimeter welding portion 46A. The radiofrequency energy flows from the upper tube-welding portion 48A through the opposing sheets 20 and the tube 12 to the lower tube-welding portion 48B. Similarly, the radiofrequency energy flows from the upper perimeter-welding portion 46A through the opposing sheets 20 to the lower perimeter-welding portion 46B. This flow of radiofrequency energy can be modeled by an electrical circuit, generally designated by reference numeral 69 in FIG. 10. Opposite lateral surfaces 66A, 66B and dielectric material 68 of the upper and lower tube-welding electrodes 60A, 60B can be modeled by capacitors C1 and C2. The arcuate surface 64A of the upper tube-welding electrode 60A and an upper portion of the tubular insert 25 can be modeled by a capacitor C3. The arcuate surface 64B of the lower tube-welding electrode 60B and a lower portion of the tubular insert 25 can be modeled by a capacitor C4. The upper and lower perimeter-welding electrodes 52, 56 and dielectric material 72 can be modeled by capacitor C5. In the electrical circuit 69, the capacitors C1, C2 and C5 are connected in parallel to each other and to the capacitors C3 and C4, which are connected in series. Generally, the following relationship for capacitance of the capacitors C1-C5 should be achieved for uniform welding of the perimeter weld 22 and tube-weld 24: $(1/C3)+(1/C4)=(1/C1)=(1/C2)=(1/C5)$. In other words, the dielectric material 68 between the lateral surfaces 66A, 66B of the tube-welding electrodes 60A, 60B must be adjusted to allow relatively more radiofrequency energy to be directed to the capacitors C3 and C4 (i.e., to the circumferential weld 26). The thickness and dielectric constant of the dielectric material 68 is such that the circumferential-weld area 26 is formed at substantially the same rate as the lateral weld areas 28 of the tube-weld 24. Similarly, the thickness and dielectric constant of the dielectric material 72 is such that the perimeter-weld 22 is formed at substantially the same rate as the tube-weld 24. Desirably, all RF die components receive the same amount of RF energy required to complete their respective welds within the same welding time allotment An exemplary process of forming the bag assembly 10 is now disclosed. The tubular insert 25 is inserted in the polymeric tube 12. The tubular insert 25 may be formed from a non-ferrous metal, such as brass or copper or aluminum or stainless steel or other material. Alternatively, the insert 25 may be formed from a material that is resiliently deformable in a radial direction and has either a higher melting temperature than the polymeric tube or is substantially insusceptible of being heated by radiofrequency energy. The insert 25 is sized and shaped to fit snugly within the axial portion of the tube 12 that is to be welded to sheets 20. Thus, the insert 25 may have a length that is substantially the same as the length of the arcuate tube-welding surfaces 64A, 64B of the tube-welding portions 48A, 48B of the die members 34, 36. It is understood that the insert 25 may have other sizes, for example, it may extend the full length of the tube. Moreover, it is understood that in lieu of the resiliently flexible insert 25, the inner surface of the tube 12 may be coated with a material that has either a higher melting temperature than the polymeric tube or is incapable of being heated by radiofrequency energy. Applicants' co-pending application Ser. No. 11/613, 694, Publication No. US 2008/0149609, entitled Apparatus and Method for Making Bag Assembly, describes the resiliently deformable tubular insert 25 in detail, and is incorporated herein by reference in its entirety.

The tube 12 with the tubular insert 25 is placed between the polymeric sheets 20 to form the bag (e.g., bladder) subassembly 42. Using the press device 38, the upper die member 34 is positioned in an initial position in which the upper die member is disposed above the lower die member 36 a distance D1 (FIG. 9). The distance D1 should be such that the bag subassembly 42 can be placed between the die members 34, 36. The bag subassembly is then placed on the lower die member. It is understood that the bag subassembly may be preassembled and then placed between the die members, as described above, or may be assembled between the die members.

After the bag subassembly 42 is placed between the die members 34, 36, the press device 38 is activated to lower the upper die member 34 to a welding position in which both the tube-welding portions 48A, 48B and the perimeter-welding portions 46A, 46B of the die members 34, 36 compress the bag subassembly (FIG. 11). RF current from the generator 40 is supplied to the perimeter-welding portion 46A and the tube-welding portion 48A of the upper die member 34. The current creates an electric field modulated in the radiofrequency range (broadly, radiofrequency energy) between the tube-welding portions 48A, 48B of the upper and lower die members 34, 36 and between the perimeter-welding portions 46A, 46B of the die members. Due to the tuning of the dielectric material 68, 72 on the upper and lower electrodes, the strength of the electrical field generated between the electrodes varies as needed to effect simultaneous formation of the perimeter-weld 22 and the tube-weld 24. Specifically, the tube 12 and corresponding portions of the sheets 20 surrounding the tube in the area of the tube-weld 24 having a relatively greater thickness are subjected to a relatively stronger electric field, and the sheets 20 between the perimeter-welding electrodes 52, 56 having a relatively smaller thickness, are simultaneously subjected to a relatively weaker electric field. As a result, the tube-weld 24 and the perimeter-weld 22 of the bag assembly are properly (fully and completely) formed substantially simultaneously in one welding operation.

After the tube-weld 24 and perimeter-weld 22 are complete, the press device 38 lifts the upper die member 34 back to its initial configuration so that the upper tube-welding electrode 60A and the upper perimeter-welding electrode 52 are not in contact with the formed bag assembly 10. At this point, the assemblage of the bag assembly is substantially complete, i.e. the bladder 16 is formed and the tube port 18 is welded in fluid communication with the bladder.

As described above, the dielectric material 72 reduces the strength of the electrical field between the perimeter-welding electrodes 52, 56 so that the perimeter weld and tube-weld 24 are completed substantially at the same time. In the embodiment of FIGS. 1-11, the dielectric material is illustrated as being secured to the outer edges of the perimeter-welding electrodes. However, the dielectric material can be positioned at other locations for reducing the strength of the electrical field between the perimeter-welding electrodes. For example, as shown in FIG. 12, a sheet 72' of dielectric material may be placed between the base of the perimeter-welding electrode 52' and the perimeter-welding block 50' of the first die member 34'. A similar sheet 72' may be placed between the base of the perimeter-welding electrode 56' and the perimeter-welding block 54' of the second die member 36'. Other arrangements are possible.

Figure 13:
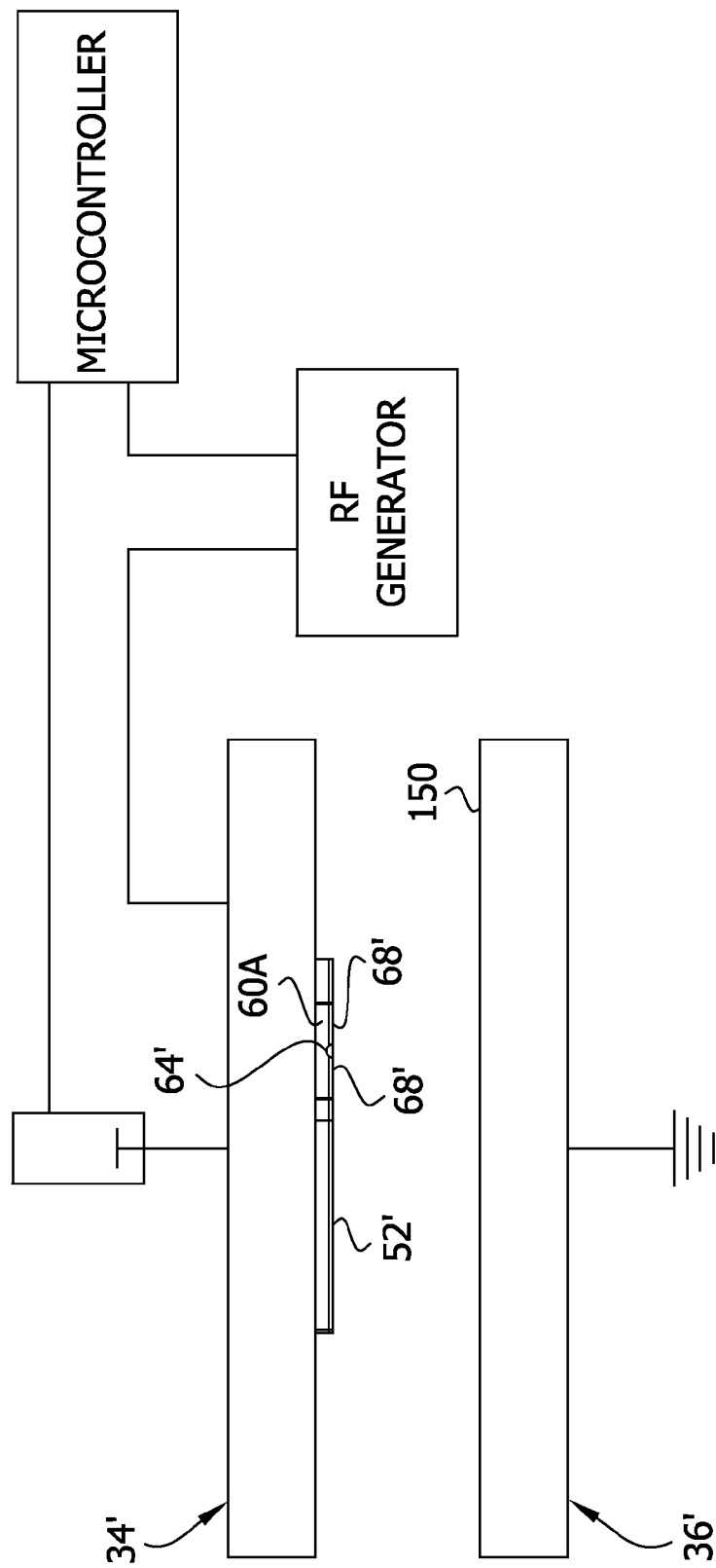
FIG. 13 is a schematic view of an alternative embodiment of a welding apparatus having different upper and lower die members compared to the previous embodiment.
Figure 14:
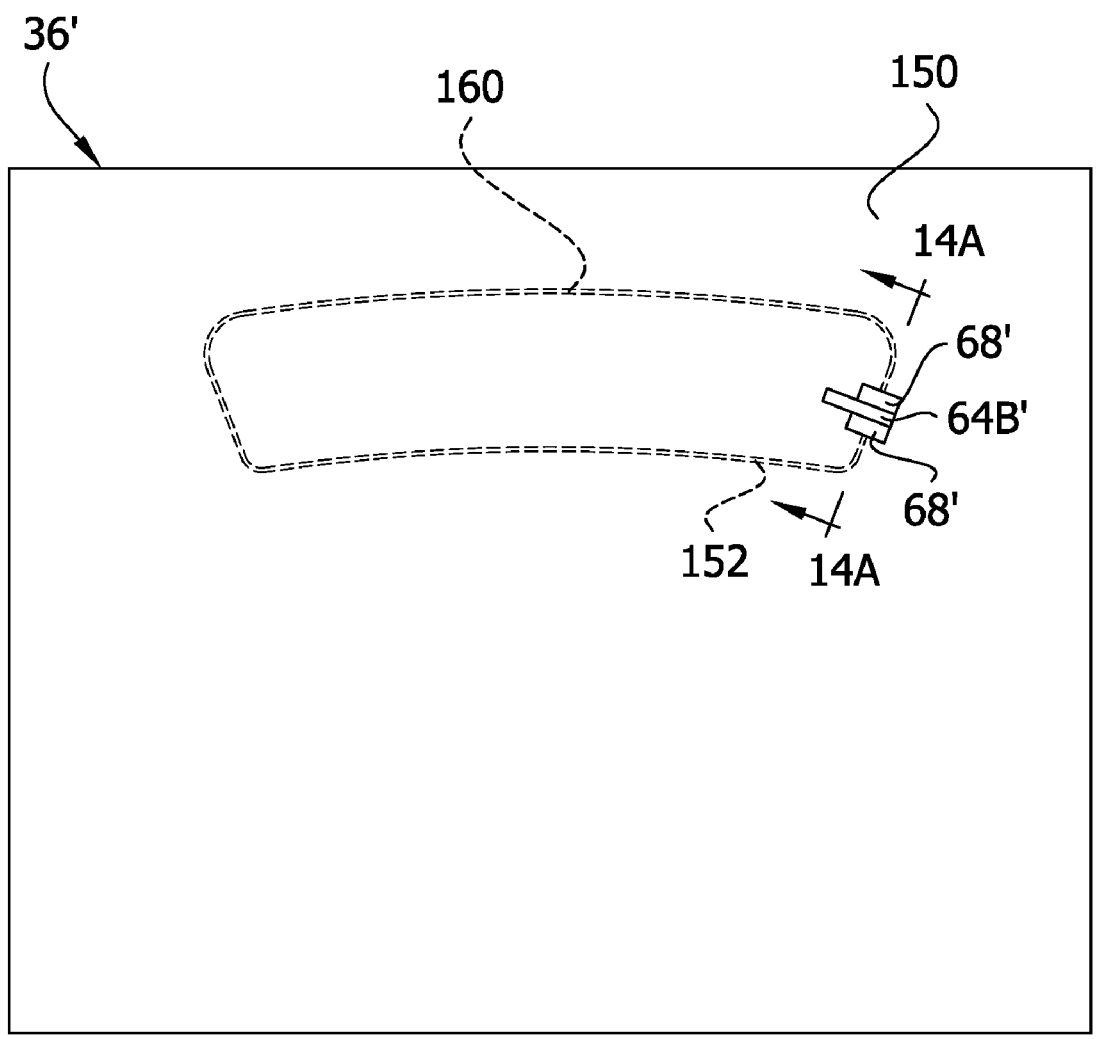
FIG. 14 is a plan view of the lower die member of FIG. 13.
Figure 14A:
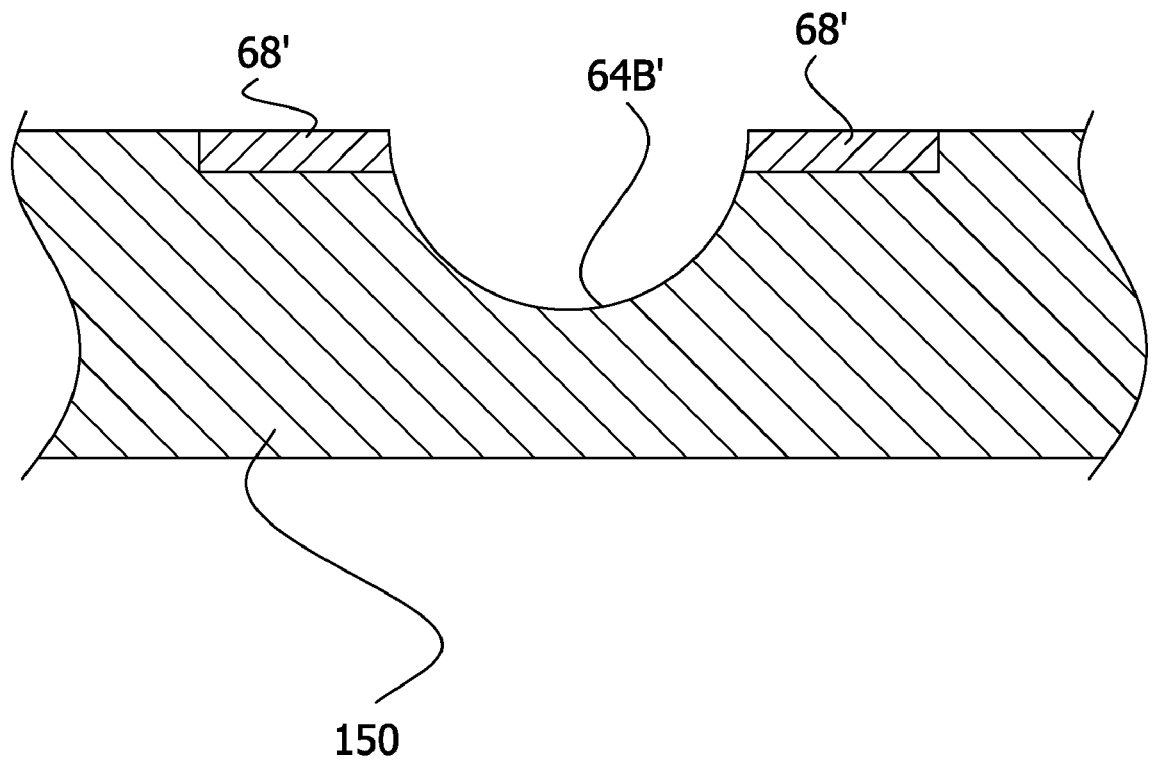
FIG. 14A is an enlarged section taken in the plane of lines 14A-14A of FIG. 14.
Figure 15:
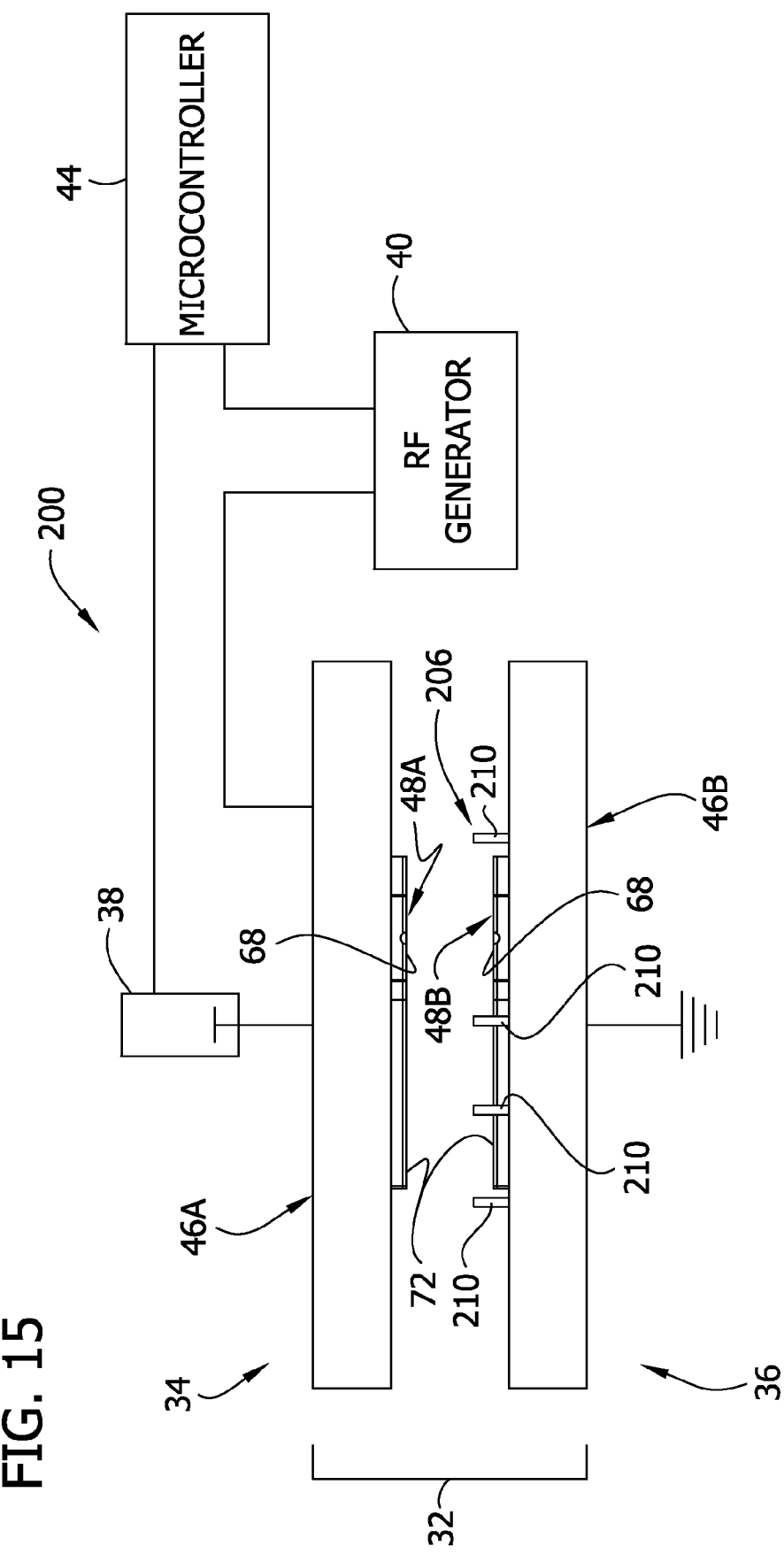
FIG. 15 is a schematic elevation of a third embodiment of a welding apparatus for manufacturing the bladder assembly of FIG. 1.

The opposing die members 34, 36 can have configurations other than as described in the previous embodiments. For example, FIGS. 13, 14 and 14A show an embodiment in which the two die members 34' and 36' are not mirror images of one another. In this embodiment, the first (upper) die member 34' is substantially identical to the first die member 34 of the first embodiment, and corresponding parts are designated by corresponding reference numbers plus a prime (') designation. On the other hand, the second (lower) die member, designated 36', has a substantially flat, continuous, planar surface 150 that opposes the first die member 34'. The surface 150 has no projecting members. Instead, the surface 150 is recessed to have a relatively small concave, arcuate surface 64B' and two co-planar flat lateral surfaces 66B' on opposite sides of the concave surface 64B'. The concave surface 64B' is complementary to the concave, arcuate surface 64A' of the tube-welding electrode 58A' on the opposing die member 34'. The two surfaces 64A', 64B' define the circumferential-weld area of the tube-weld 24. Dielectric elements 68' are secured (e.g., by adhesive) to the recessed lateral surfaces 66B' of the second die 36' at opposite sides of the arcuate surface 64B'. The upper surfaces of these elements 68' are generally co-planar with the surface 150 and are located generally opposite the dielectric elements 68' on the tube-welding electrode 60A' of the opposing die member 34' to define the lateral-weld areas of the tube-weld. Unlike the first die member 34', the second die member 36' has no perimeter-welding electrode projecting from surface 150. Instead, the perimeter-welding electrode of the second die member is defined by an area 160 (or areas) of the surface 150 generally opposing the first perimeter-welding electrode 52' (see FIG. 14).

Referring now to FIGS. 15-18, another embodiment of a welding apparatus for manufacturing the bag assembly is generally indicated at 200. This embodiment is substantially similar to the embodiment of FIGS. 1-11, and corresponding parts are indicated by corresponding reference numerals. However, the welding apparatus 200 of this embodiment includes a stop device, generally designated 206, for limiting movement of the opposing perimeter-welding portions 46A, 46B of the two die members 34, 36 toward each other to prevent excessive displacement of sheet material in the perimeter-weld 22 by engagement with the perimeter-welding portions. By limiting penetration of the die members into the heated sheet material during the welding process, the perimeter-welding portions 46A, 46B can be held in position for a longer length of time without damage (e.g., overheating, thinning) to the perimeter-weld 22, thus allowing the tube-weld 24 a longer time in which to fully form. As a result, both the perimeter-weld 22 and the tube-weld 24 can be completed in a single welding operation. In embodiments where each die member 34, 36 is constructed so that the tube-welding portion 48A, 48B of the die member is fixed and immovable relative to the perimeter-welding portion 46A, 46B of the die member, the stop device 206 will also limit movement of the opposing tube-welding portions of the two die members toward each other to prevent excessive displacement of sheet material in the tube-weld 24 by engagement with the tube-welding portions. However, in embodiments where the tube-welding portion 48A, 48B of a die member 34, 36 is movable relative to the perimeter-welding portion 52, 56 of the die member, as is described in Applicants' aforementioned co-pending application Ser. No. 11/613,694, Publication No. US 2008/0149609, the stop device 206 may or may not limit the opposing tube-welding portions 206 of the two die members toward each other. In general, however, the spacing between all welding surfaces must be controlled to achieve proper one-step welding.

Figure 16:
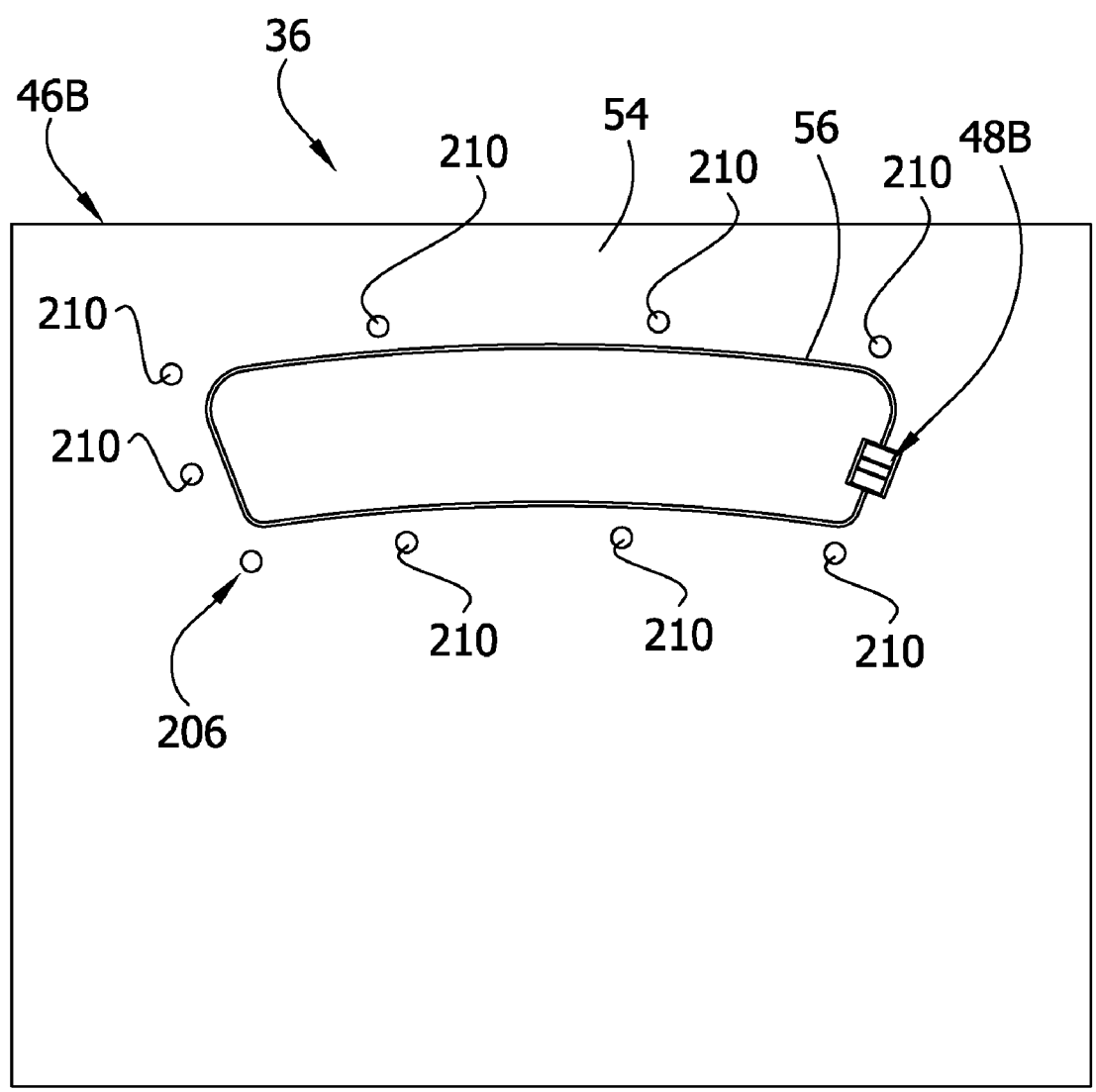
FIG. 16 is a plan view of the lower die member of FIG. 15.

Desirably, the stop device 206 comprises at least one stand-off in the form of one or more columns 210 (broadly, a stop structure) disposed between the opposing die members 34, 36 for limiting movement of at least the opposing perimeter-welding portions 46A, 46B toward each other. As illustrated in FIG. 16, the columns are generally cylindrical and positioned along a perimeter of the perimeter-welding portion 46B of the lower die member 36. It is understood that the column(s) 210 may have other shapes. Further, a single, continuous stop structure may be used. In any case, the stop device 206 may comprise structure on the lower die member 36 (as shown) or on the upper die member 34 or on both die members.

Figure 17:
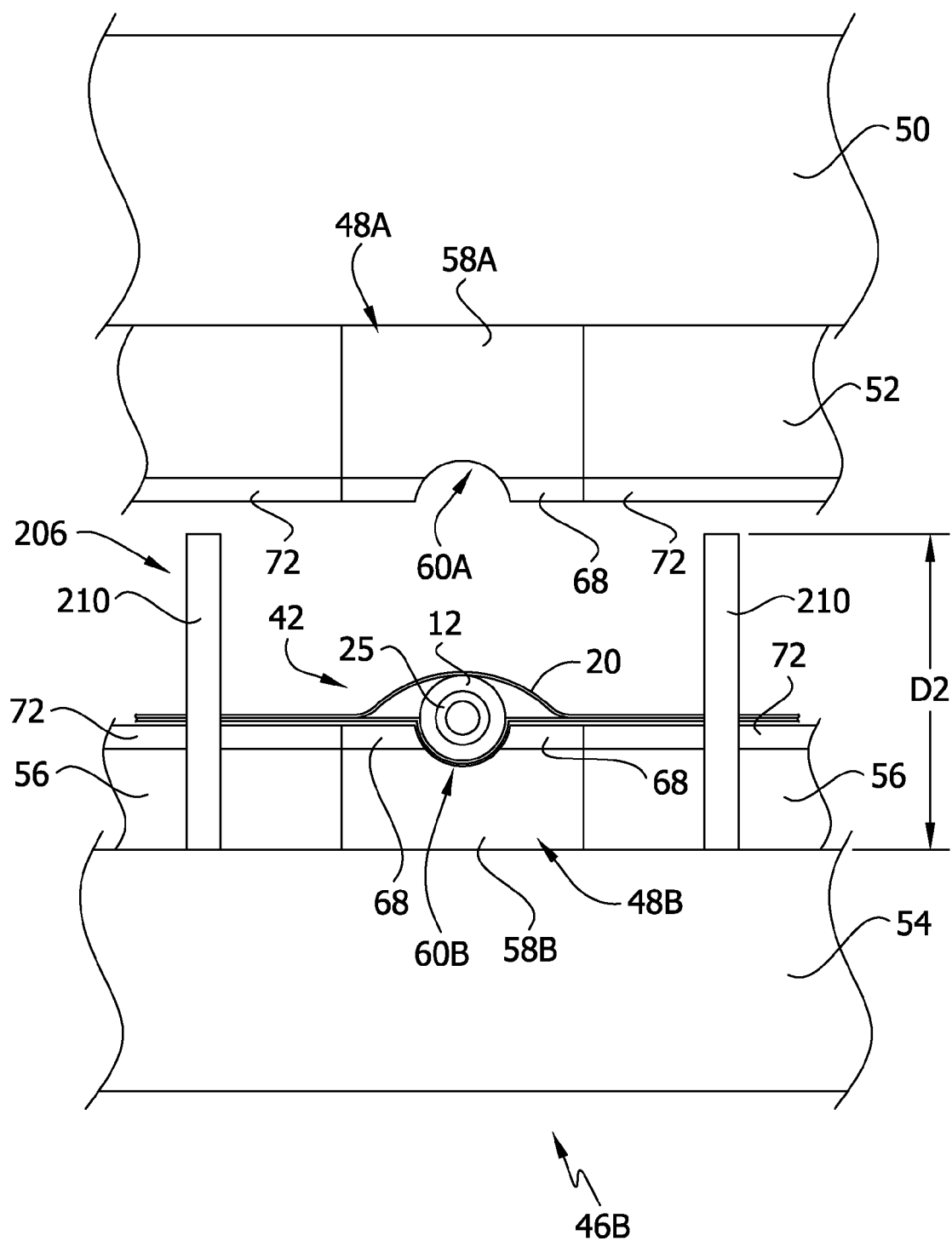
FIG. 17 is an enlarged, fragmentary section of the upper and lower die members with the upper die member in an initial configuration and a bladder subassembly disposed between the upper and lower die members of the second embodiment.
Figure 18:
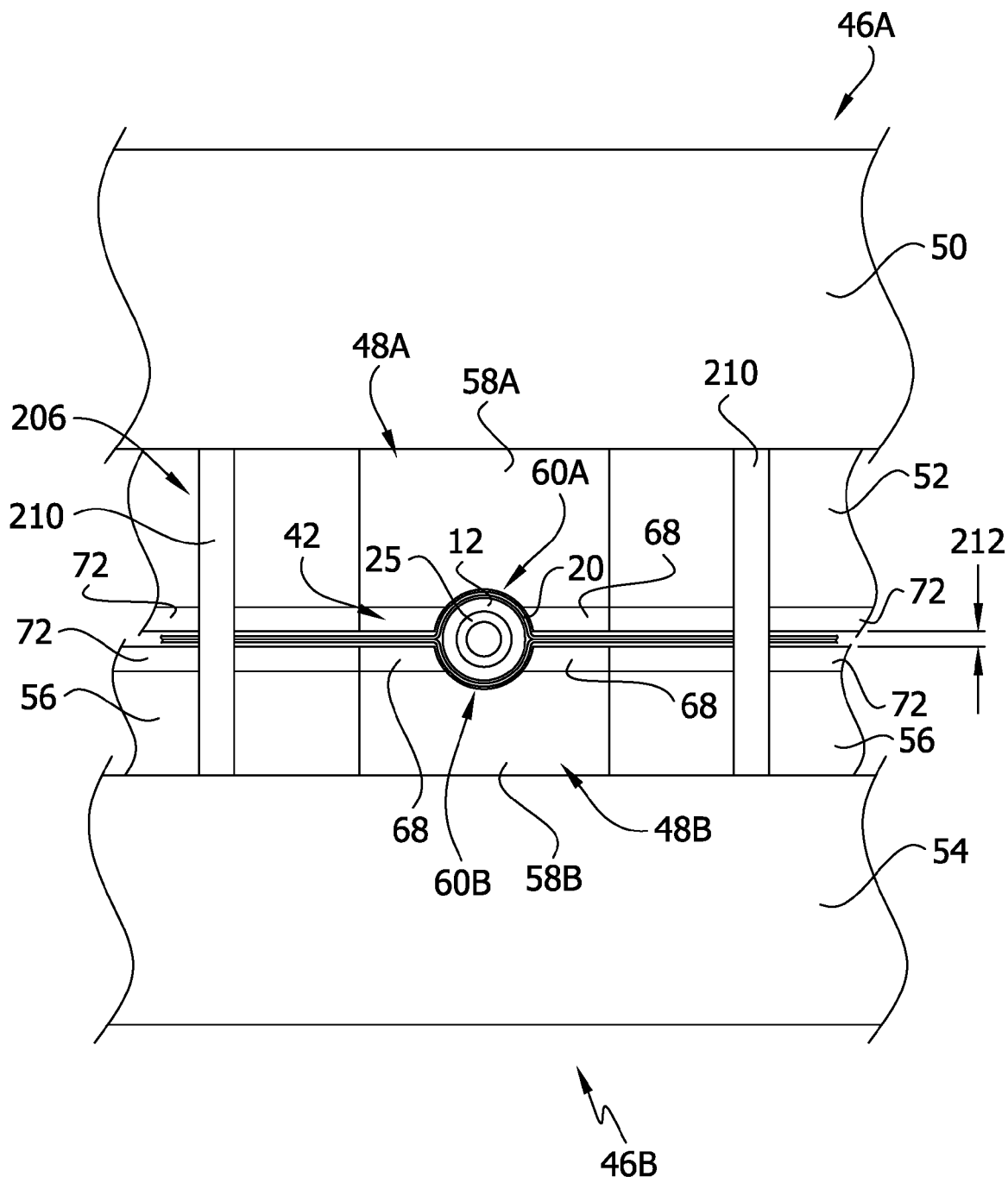
FIG. 18 is similar to FIG. 17 with the upper die member being in a primary welding configuration, in which a perimeter-weld and a tube-weld are being formed on the bladder assembly.

Referring to FIGS. 17 and 18, the stop device 206 extends up from the lower die member 36 a distance D2. In general, the magnitude of this distance D2 is such that when the stop device contacts the perimeter-welding block 50 of the upper die member 34, the space or gap 212 between the perimeter-welding portions 46A, 46B of the upper and lower die members 34, 36 is desirably approximately equal to, and not substantially less than, the desired thickness of the final perimeter-weld 22 in the bag assembly 10. As a result, the stop device 206 limits penetration of the perimeter-weld portions 46A, 46B into the heated sheet material during the welding process, thereby avoiding excessive displacement of sheet material and undesirable burning and/or thinning of the perimeter-weld 22. (The excessive displacement would be caused by the pressure contact of the perimeter-welding electrodes 52, 56 or any dielectric material 72 thereon with the heated sheet material.) By way of example, as illustrated in FIG. 18, the stop device 206 may set the minimum gap 212 between the perimeter-welding portions 46A, 46B to a distance that corresponds to the desired final thickness of the perimeter-weld, which may vary according to each material type and/or material thickness. In any event, the stop device 206 should not adversely affect the operation of the tube-welding portions 48A, 48B of the die members 34, 36.

The stop device 206 can be configured to increase or decrease the minimum space or gap 212 between the perimeter-welding portions 46A, 46B of the upper and lower die members 34, 36. By way of example, if the stop device 206 comprises one or more columns 210 (as illustrated), the lengths of the columns can be varied to provide the desired gap 212. In this way, excessive penetration of the weld areas by the dielectric material on the electrodes, or by the electrodes if there is no dielectric material on them, is avoided.

Other ways of limiting the movement of at least the perimeter-welding portions 46A, 46B of the upper and lower die members 34, 36 toward one another are within the scope of this invention.

It is understood that the stop device 206 can be used in embodiments where one or more of the electrodes 52, 56, 60A, 60B include dielectric material 68, 68', 72, 72' (as described above) and in embodiments where one or more of the electrodes 52, 56, 60A, 60B do not include dielectric material. Further, the teachings above regarding the use of a stop device and dielectric material on the perimeter-welding electrodes 52, 56 can be applied to the welding apparatus disclosed in Applicants' aforementioned co-pending application Ser. No. 11/613,694, Publication No. US 2008/0149609 entitled Apparatus and Method for Making Bag Assembly. Also, the stop device 206 can be used in embodiments where the opposing die members are not mirror images of one another. For example, as discussed above in regard to the embodiment of FIGS. 13 and 14, one of the die members, like the die member 34', may have a flat, continuous, planar surface without projecting electrodes.

When introducing elements of the present invention or the preferred embodiments(s) thereof, the terms "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. Welding apparatus for use in one-step welding to form a bag assembly comprising a bag and a tube in fluid communication with the bag, the welding apparatus comprising:

first and second die members opposing one another and defining a space therebetween for receiving opposing sheets and a tube therebetween, the first and second die members including opposing respective first and second perimeter-welding electrodes adapted to weld the sheets together to define a perimeter-weld of the bag and opposing respective first and second tube-welding electrodes adapted to weld the sheets to the tube to define a tube-weld so that the tube is in fluid communication with the bag;

a single source of high frequency energy electrically connected to the first and second perimeter-welding electrodes and the first and second tube-welding electrodes to produce a high frequency electric field between the perimeter-welding electrodes and the tube-welding electrodes; and dielectric material for reducing the strength of the high frequency electric field between the first and second perimeter-welding electrodes as compared to a strength of the high frequency electric field between the first and second tube-welding electrodes so that the sheets are welded to the tube and the sheets are welded together in a single welding operation;

wherein the first and second tube-welding electrodes each have a circumferential-welding surface and opposite lateral-welding surfaces, and wherein a second dielectric material is provided having a selected thickness and a selected dielectric constant for reducing the strength of the high frequency electric field between the lateral-welding surfaces of the tube-welding electrodes as compared to the strength of the high frequency field between the circumferential-welding surfaces so that lateral-weld areas of the sheets are welded at generally the same rate as the tube and the sheets are welded together.

2. Welding apparatus as set forth in claim 1 wherein said first perimeter-welding electrode comprises a first ribbon electrode having an outer edge opposing said second perimeter-welding electrode, said dielectric material comprising a first dielectric strip extending along said outer edge.

3. Welding apparatus as set forth in claim 1 wherein first die member further comprises a first perimeter-welding block, and wherein said first perimeter-welding electrode comprises a first ribbon electrode projecting from the first perimeter-welding block, said dielectric material comprising a dielectric sheet disposed between the first perimeter-welding block and said first ribbon electrode.

4. Welding apparatus as set forth in claim 3 wherein said second perimeter-welding electrode comprises a second ribbon electrode opposing the first ribbon electrode.

5. Welding apparatus as set forth in claim 3 wherein said second die member further comprises a second perimeter-welding block having a substantially planar surface facing said first perimeter-welding block, said second perimeter-welding electrode comprising an area of said substantially planar surface generally opposing said first ribbon electrode.

6. Welding apparatus as set forth in claim 5 wherein said second tube-welding electrode comprises a concave surface recessed in said substantially planar surface generally opposing said first tube-welding electrode.

7. Welding apparatus as set forth in claim 1 wherein the second dielectric material is secured to opposing lateral welding surfaces of the first and second tube-welding electrodes.

8. Welding apparatus as set forth in claim 1 further comprising a stop device for limiting penetration of the first tube-welding electrode and first perimeter-welding electrode into the sheets.

9. Welding apparatus as set forth in claim 1 wherein the first tube-welding electrode is secured in fixed position relative to the first perimeter-welding electrode and the second tube-welding electrode is secured in fixed position relative to the second perimeter-welding electrode.

10. Welding apparatus for use in one-step welding to form a bag assembly comprising a bag and a tube in fluid communication with the bag, the welding apparatus comprising:

first and second die members opposing one another and defining a space therebetween for receiving opposing sheets and a tube therebetween, the first and second die members including opposing respective first and second perimeter-welding electrodes adapted to weld the sheets together to define a perimeter-weld of the bag and opposing respective first and second tube-welding electrodes adapted to weld the sheets to the tube to define a tube-weld so that the tube is in fluid communication with the bag;

a single source of high frequency energy electrically connected to the first and second perimeter-welding electrodes and the first and second tube-welding electrodes to produce a high frequency electric field between the perimeter-welding electrodes and the tube-welding electrodes; and dielectric material for reducing the strength of the high frequency electric field between the first and second perimeter-welding electrodes as compared to a strength of the high frequency electric field between the first and second tube-welding electrodes so that the sheets are welded to the tube and the sheets are welded together in a single welding operation;

the first die member further comprising a first perimeter-welding block, and said first perimeter-welding electrode further comprising a first ribbon electrode projecting from the first perimeter-welding block, said dielectric material comprising a dielectric sheet disposed between the first perimeter-welding block and said first ribbon electrode.

* * * * *